US011952154B2

(12) United States Patent
Morimura et al.

(10) Patent No.: US 11,952,154 B2
(45) Date of Patent: Apr. 9, 2024

(54) BINDING MACHINE

(71) Applicant: MAX CO., LTD., Tokyo (JP)

(72) Inventors: Kouichirou Morimura, Tokyo (JP); Yusuke Yoshida, Tokyo (JP); Ichiro Kusakari, Tokyo (JP); Osamu Itagaki, Tokyo (JP); Shinpei Sugihara, Tokyo (JP)

(73) Assignee: MAX CO., LTD., Tokyo (JP)

( * ) Notice: Subject to any disclaimer, the term of this patent is extended or adjusted under 35 U.S.C. 154(b) by 0 days.

(21) Appl. No.: 17/172,924

(22) Filed: Feb. 10, 2021

(65) Prior Publication Data

US 2021/0245906 A1 Aug. 12, 2021

(30) Foreign Application Priority Data

Feb. 10, 2020 (JP) ................................. 2020-021025
Dec. 29, 2020 (JP) ................................. 2020-219758

(51) Int. Cl.
*B21F 15/04* (2006.01)
*B25B 25/00* (2006.01)
(Continued)

(52) U.S. Cl.
CPC ............ *B65B 13/025* (2013.01); *B25B 25/00* (2013.01); *B65B 13/22* (2013.01); *B65B 13/285* (2013.01); *E04G 21/123* (2013.01)

(58) Field of Classification Search
CPC ..... E04G 21/122; E04G 21/123; B65B 13/22; B65B 13/28; B65B 13/285; B65B 13/185; B21D 15/04; B21F 15/04
See application file for complete search history.

(56) References Cited

U.S. PATENT DOCUMENTS 4,362,192 A 12/1982 Furlong et al.
5,871,036 A * 2/1999 Murayama ............ E04G 21/123 140/57
(Continued)

FOREIGN PATENT DOCUMENTS

CA 2763112 A1 12/2010
CN 1433932 A 8/2003
(Continued)

OTHER PUBLICATIONS

Extended European Search Report for EP Application No. 21156033.9 dated Jul. 2, 2021. (pp. 8).
(Continued)

*Primary Examiner* — Debra M Sullivan
(74) *Attorney, Agent, or Firm* — WEIHROUCH IP

(57) ABSTRACT

A binding machine includes: a wire feeding unit; a curl forming unit; a butting part; a cutting unit; and a binding unit. The binding unit includes: a rotary shaft; a wire engaging body configured to move in an axis direction of the rotary shaft and to engage the wire in a first operation area in the axis direction, and to move in the axis direction and to twist the wire in a second operation area in the axis direction; a rotation regulation part; and a tension applying part configured to perform, in the second operation area, an operation of applying tension on the wire engaged by the wire engaging body in the first operation area. The tension applied to the wire is equal to or larger than 10% and equal to or smaller than 50% with respect to a maximum tensile load of the wire.

4 Claims, 20 Drawing Sheets

(51) Int. Cl.

| | |
|---|---|
| ***B65B 13/02*** | (2006.01) |
| ***B65B 13/22*** | (2006.01) |
| ***B65B 13/28*** | (2006.01) |
| ***E04G 21/12*** | (2006.01) |

(56) References Cited

U.S. PATENT DOCUMENTS

| | | | |
|---|---|---|---|
| 5,944,064 | A | 8/1999 | Saito et al. |
| 5,956,989 | A * | 9/1999 | Kusakari ............... E04G 21/122 72/119 |
| 2003/0136278 | A1 | 7/2003 | Miyazaki et al. |
| 2004/0244866 | A1 | 12/2004 | Ishikawa et al. |
| 2005/0005991 | A1 | 1/2005 | Ishikawa et al. |
| 2007/0199610 | A1 | 8/2007 | Itagaki |
| 2009/0283167 | A1 | 11/2009 | Nakagawa et al. |
| 2009/0283170 | A1 | 11/2009 | Nagaoka |
| 2009/0283171 | A1 | 11/2009 | Nagaoka et al. |
| 2010/0293902 | A1 | 11/2010 | Jensen |
| 2014/0091171 | A1 | 4/2014 | Nakagawa et al. |
| 2015/0210411 | A1 | 7/2015 | Finzo et al. |
| 2015/0246739 | A1 | 9/2015 | Finzo et al. |
| 2015/0266082 | A1 | 9/2015 | Horn |
| 2016/0107775 | A1 | 4/2016 | Amacker et al. |
| 2016/0107776 | A1 | 4/2016 | Amacker et al. |
| 2016/0137323 | A1 | 5/2016 | Amacker |
| 2016/0159505 | A1 | 6/2016 | Widmer et al. |
| 2017/0130472 | A1 | 5/2017 | Nakagawa et al. |
| 2017/0218631 | A1 | 8/2017 | Matsuno |
| 2018/0148943 | A1 | 5/2018 | Itagaki et al. |
| 2018/0155940 | A1 | 6/2018 | Nagaoka et al. |
| 2018/0161848 | A1 | 6/2018 | Itagaki et al. |
| 2018/0187434 | A1 | 7/2018 | Itagaki et al. |
| 2018/0187435 | A1 | 7/2018 | Itagaki et al. |
| 2018/0194497 | A1 | 7/2018 | Finzo et al. |
| 2018/0195299 | A1 | 7/2018 | Itagaki |
| 2019/0249447 | A1 | 8/2019 | Itagaki et al. |
| 2019/0300214 | A1 | 10/2019 | Finzo et al. |
| 2020/0149279 | A1 | 5/2020 | Matsuno |
| 2020/0378140 | A1 | 12/2020 | Itagaki et al. |
| 2020/0399914 | A1 | 12/2020 | Nagaoka et al. |
| 2021/0010282 | A1 | 1/2021 | Itagaki et al. |
| 2021/0114080 | A1 | 4/2021 | Itagaki et al. |
| 2021/0138527 | A1 | 5/2021 | Itagaki et al. |
| 2021/0189746 | A1 | 6/2021 | Itagaki |
| 2021/0245229 | A1 | 8/2021 | Yoshida et al. |
| 2021/0245904 | A1 | 8/2021 | Itagaki et al. |
| 2021/0245906 | A1 | 8/2021 | Morimura et al. |
| 2022/0185517 | A1 | 6/2022 | Finzo et al. |
| 2023/0145839 | A1 | 5/2023 | Finzo et al. |

FOREIGN PATENT DOCUMENTS

| | | | |
|---|---|---|---|
| CN | 1985058 | A | 6/2007 |
| CN | 105358432 | A | 2/2016 |
| CN | 107031891 | A | 8/2017 |
| CN | 107849858 | A | 3/2018 |
| CN | 108327970 | A | 7/2018 |
| CN | 108457474 | A | 8/2018 |
| EP | 0751269 | A1 | 1/1997 |
| EP | 1415917 | A1 | 5/2005 |
| EP | 2123848 | A2 | 11/2009 |
| EP | 3326921 | A1 | 5/2018 |
| EP | 3327220 | A1 | 5/2018 |
| JP | 2003-34305 | A | 2/2003 |
| JP | 2016-030625 | A | 3/2016 |
| RU | 38729 | U1 | 7/2004 |
| SE | 9804114 | L | 5/2000 |
| TW | 533169 | B | 5/2003 |
| WO | 0036249 | A1 | 6/2000 |
| WO | 2010136530 | A2 | 12/2010 |

OTHER PUBLICATIONS

Chilean Office Action dated May 16, 2022, issued by the Chilean Patent Office in the corresponding Chilean Patent Application No. 202100359. (15 pages).

Russian Search Report for Russian Application No. 2021103117, dated Mar. 27, 2023. (6 pages).

Chinese Office Action for CN Application No. 202110183585.5 dated May 30, 2023 (8 pp).

* cited by examiner

BINDING MACHINE

CROSS-REFERENCE TO RELATED APPLICATION(S)

This application is based upon and claims the benefit of priority from prior Japanese patent application No. 2020-021025, filed on Feb. 10, 2020, and Japanese patent application No. 2020-219758, filed on Dec. 29, 2020, the entire content, of which are incorporated herein by reference.

TECHNICAL FIELD

The present invention relates to a binding machine configured to bind a to-be-bound object such as a reinforcing bar with a wire.

BACKGROUND ART

For concrete buildings, reinforcing bars are used so as to improve strength. The reinforcing bars are bound with wires so that the reinforcing bars do not deviate from predetermined positions during concrete placement.

In the related art, suggested is a binding machine referred to as a reinforcing bar binding machine configured to wind two or more reinforcing bars with a wire, and to twist the wire wound on the reinforcing bar, thereby binding the two or more reinforcing bars with the wire. The binding machine is configured to cause the wire fed with a drive force of a motor to pass through a guide referred to as a curl guide and configured to form the wire with a curl, thereby winding the wire around the reinforcing bars. A guide referred to as an induction guide guides the curled wire to a binding unit configured to twist the wire, so that the wire wound around the reinforcing bars is twisted by the binding unit and the reinforcing bars are thus bound with the wire.

When binding the reinforcing bars with the wire, if the binding is loosened, the reinforcing bars deviate each other, so that it is required to firmly maintain the reinforcing bars. Therefore, as the binding machine configured to feed and twist one or more wires, suggested is a binding machine configured to pull back an extra part of the wire, thereby improving a binding force (for example, refer to PTL 1).

[PTL 1] JP-A-2003-034305

However, when pulling back the extra part of the wire, it may not be possible to sufficiently remove the loosening due to the extra part of the wire, because of a friction force between the reinforcing bar and the wire, for example, so that the sufficient binding force may not be secured, as compared to a case where the wire is bound using a manual tool of the related art. In addition, in order to improve the binding force, it is considered to increase outputs of the motor configured to feed the wire and the motor configured to actuate the binding unit, thereby increasing the tension to be applied to the wire. However, in order to increase the tension to be applied to the wire, it is inevitable to increase a size of the motor and a size of the entire device so as to make the device sturdy, which leads to deterioration of a handling property as a product.

The present invention has been made in view of the above situations, and an object thereof is to provide a binding machine capable of applying appropriate tension to a wire so as to remove loosening due to an extra part of the wire.

SUMMARY OF INVENTION

According to an aspect of the present invention, there is provided a binding machine comprising: a wire feeding unit configured to feed a wire, a curl forming unit configured to form a path along which the wire fed by the wire feeding unit is to be wound around a to-be-bound object; a butting part against which the to-be-bound object is to be butted; a cutting unit configured to cut the wire wound on the to-be-bound object; and a binding unit configured to twist the wire wound on the to-be-bound object, wherein the binding unit comprises: a rotary shaft; a wire engaging body configured to move in an axis direction of the rotary shaft and to engage the wire in a first operation area in the axis direction of the rotary shaft, and configured to move in the axis direction of the rotary shaft and to twist the wire with rotating together with the rotary shaft in a second operation area in the axis direction of the rotary shaft; a rotation regulation part configured to regulate rotation of the wire engaging body; and a tension applying part configured to perform, in the second operation area, an operation of applying tension on the wire engaged by the wire engaging body in the first operation area, and wherein the tension applied to the wire is equal to or larger than 10% and equal to or smaller than 50% with respect to a maximum tensile load of the wire.

According to an aspect of the present invention, the wire is fed in the forward direction by the wire feeding unit, the wire is wound around the to-be-bound object by the curl guide and the induction guide, and the wire is engaged by the wire engaging body by the operation in the first operation area of the wire engaging body. The wire is also fed in the reverse direction by the wire feeding unit, is wound on the to-be-bound object and is cut by the cutting unit. The tension applying part performs the operation of applying tension on the wire wound on the to-be-bound object by the operation in the second operation area of the wire engaging body. The tension applied to the wire is equal to or larger than 10% and equal to or smaller than 50% with respect to the maximum tensile load of the wire.

According to an aspect of the present invention, the operation of applying tension is performed on the wire wound on the to-be-bound object so that the tension applied to the wire in twisting the wire is equal to or larger than 10% and equal to or smaller than 50% with respect to the maximum tensile load of the wire. Thereby, the loosening due to an extra part of the wire can be removed, the wire can be closely contacted to the to-be-bound object, and the wire W can be prevented from being carelessly cut. In addition, it is possible to suppress the unnecessarily high outputs of the motor that feeds the wire and the motor that actuates the binding unit.

DESCRIPTION OF EMBODIMENTS

Hereinbelow, an example of a reinforcing bar binding machine that is an embodiment of the binding machine of the present invention will be described with reference to the drawings.

<Configuration Example of Reinforcing Bar Binding Machine>

Figure 1:
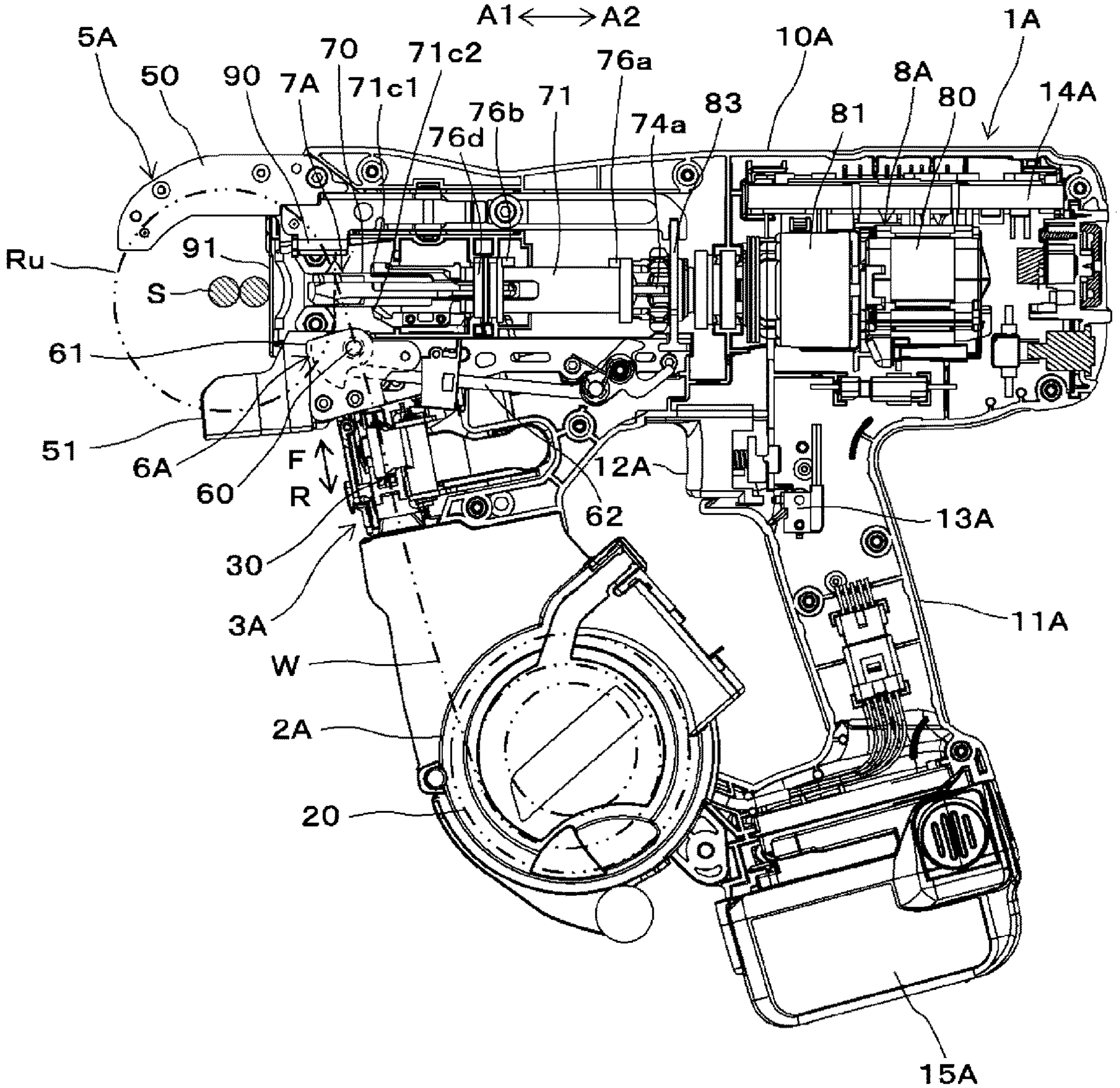
FIG. 1 is a view depicting an example of an entire configuration of a reinforcing bar binding machine, as seen from a side.

FIG. 1 is a view depicting an example of an entire configuration of a reinforcing bar binding machine, as seen from a side. A reinforcing bar binding machine 1A has such a shape that an operator grips with a hand, and includes a main body part 10A and a handle part 11A.

The reinforcing bar binding machine 1A is configured to feed a wire W in a forward direction denoted with an arrow F, to wind the wire around reinforcing bars S, which are a to-be-bound object, to feed the wire W wound around the reinforcing bars S in a reverse direction denoted with an arrow R, to wind the wire on the reinforcing bars S, and to twist the wire W, thereby binding the reinforcing bars S with the wire W.

In order to implement the above functions, the reinforcing bar binding machine 1A includes a magazine 2A in which the wire W is accommodated, and a wire feeding unit 3A configured to feed the wire W. The reinforcing bar binding machine 1A also includes a curl forming unit 5A configured to form a path along which the wire W fed by the wire feeding unit 3A is to be wound around the reinforcing bars S, and a cutting unit 6A configured to cut the wire W wound on the reinforcing bars S. The reinforcing bar binding machine 1A also includes a binding unit 7A configured to twist the wire W wound on the reinforcing bars S, and a drive unit 8A configured to drive the binding unit 7A.

The magazine 2A is an example of an accommodation unit in which a reel 20 on which the long wire W is wound to be reeled out is rotatably and detachably accommodated. For the wire W, a wire made of a plastically deformable metal wire, a wire having a metal wire covered with a resin, a twisted wire and the like are used. The reel 20 is configured so that one or more wires W are wound on a hub part (not shown) and can be reeled out from the reel 20 at the same time.

The wire feeding unit 3A includes a pair of feeding gears 30 configured to sandwich and feed one or more wires W aligned in parallel. In the wire feeding unit 3A, a rotating operation of a feeding motor (not shown) is transmitted to rotate the feeding gears 30. Thereby, the wire feeding unit 3A feeds the wire W sandwiched between the pair of feeding gears 30 along an extension direction of the wire W. In a configuration where a plurality of, for example, two wires W are fed, the two wires W are fed aligned in parallel.

The wire feeding unit 3A is configured so that the rotation directions of the feeding gears 30 are switched and the feeding direction of the wire W is switched between forward and reverse directions by switching the rotation direction of the feeding motor (not shown) between forward and reverse directions.

The curl forming unit 5A includes a curl guide 50 configured to curl the wire W that is fed by the wire feeding unit 30, and an induction guide 51 configured to guide the wire W curled by the curl guide 50 toward the binding unit 7A. In the reinforcing bar binding machine 1A, a path of the wire W that is fed by the wire feeding unit 3A is regulated by the curl forming unit 5A, so that a locus of the wire W becomes a loop Ru as shown with a broken line in FIG. 1 and the wire W is thus wound around the reinforcing bars S.

The cutting unit 6A includes a fixed blade part 60, a movable blade part 61 configured to cut the wire W in cooperation with the fixed blade part 60, and a transmission mechanism 62 configured to transmit an operation of the binding unit 7A to the movable blade part 61. The cutting unit 6A is configured to cut the wire W by a rotating operation of the movable blade part 61 about the fixed blade part 60, which is a support point. The transmission mechanism 62 is configured to transmit an operation of the binding unit 7A to the movable blade part 61 via a movable member 83 and to rotate the movable blade part 61 in conjunction with an operation of the binding unit 7A, thereby cutting the wire W.

The binding unit 7A includes a wire engaging body 70 to which the wire W is engaged. A detailed embodiment of the binding unit 7A will be described later. The drive unit 8A includes a motor 80, and a decelerator 81 configured to perform deceleration and amplification of torque.

The reinforcing bar binding machine 1A includes a feeding regulation part 90 against which a tip end of the wire W is butted, on a feeding path of the wire W that is engaged by the wire engaging body 70. In the reinforcing bar binding machine 1A, the curl guide 50 and the induction guide 51 of the curl forming unit 5A are provided at an end portion on a front side of the main body part 10A. In the reinforcing bar binding machine 1A, a butting part 91 against which the reinforcing bars S are to be butted is provided at the end portion on the front side of the main body part 10A and between the curl guide 50 and the induction guide 51.

In the reinforcing bar binding machine 1A, the handle part 11A extends downwardly from the main body part 10A. Also, a battery 15A is detachably mounted to a lower part of the handle part 11A. Also, the magazine 2A of the reinforcing bar binding machine 1A is provided in front of the handle part 11A. In the main body part 10A of the reinforcing bar binding machine 1A, the wire feeding unit 3A, the cutting unit 6A, the binding unit 7A, the drive unit 8A configured to drive the binding unit 7A, and the like are accommodated.

A trigger 12A is provided on a front side of the handle part 11A of the reinforcing bar binding machine 1A, and a switch 13A is provided inside the handle part 11A. The reinforcing bar binding machine 1A is configured so that a control unit 14A controls the motor 80 and the feeding motor (not shown) according to a state of the switch 13A pushed as a result of an operation on the trigger 12A.

<Configuration Example of Binding Unit and Drive Unit of First Embodiment>

Figure 2A:
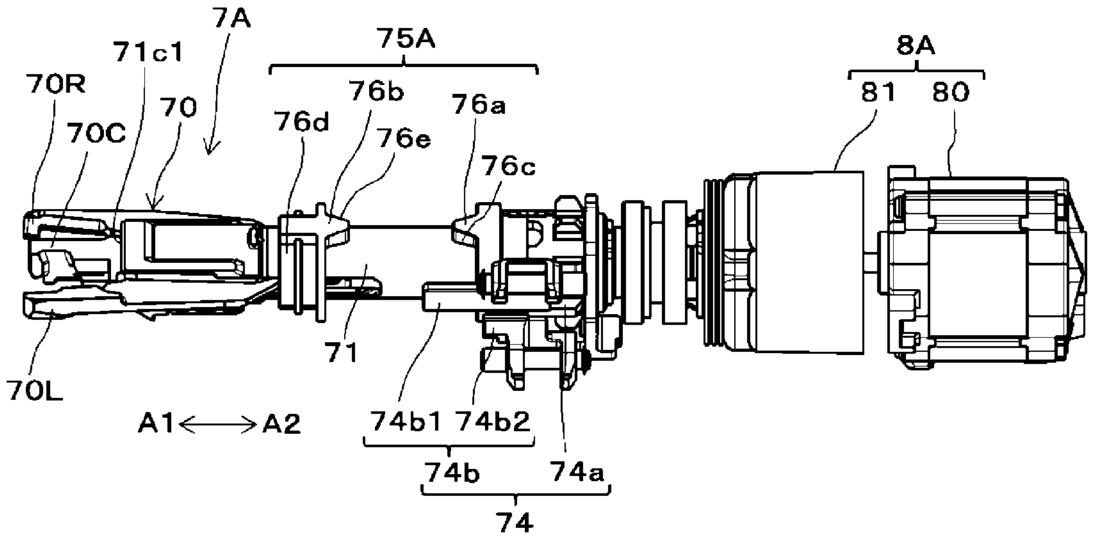
FIG. 2A is a perspective view depicting an example of a binding unit and a drive unit of a first embodiment.
Figure 2B:
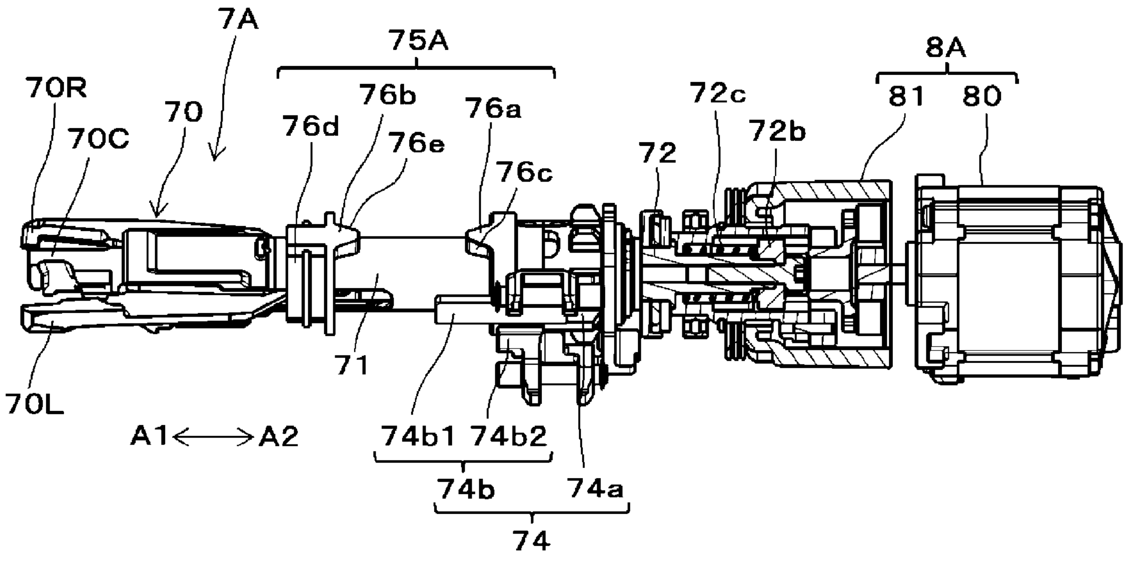
FIG. 2B is a sectional perspective view of main parts depicting the example of the binding unit and the drive unit of the first embodiment.
Figure 2C:
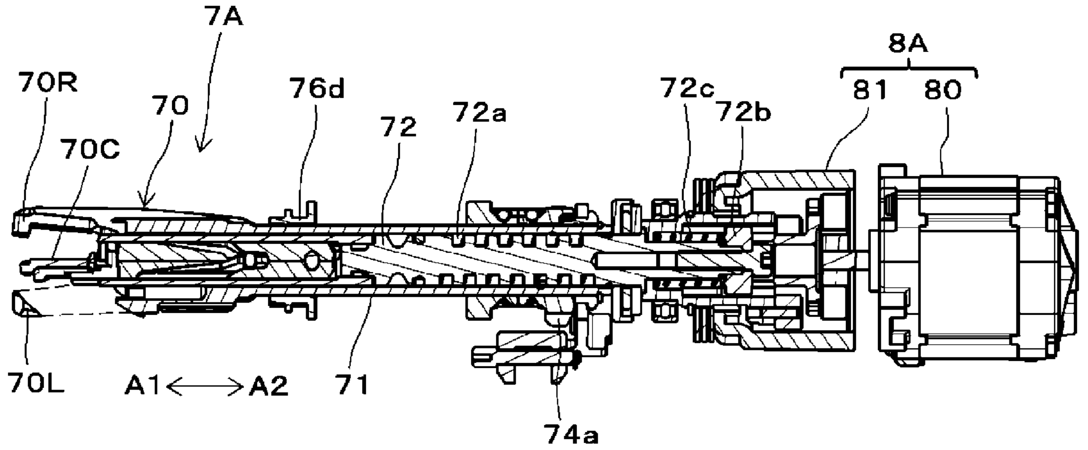
FIG. 2C is a sectional perspective view depicting the example of the binding unit and the drive unit of the first embodiment.
Figure 2D:
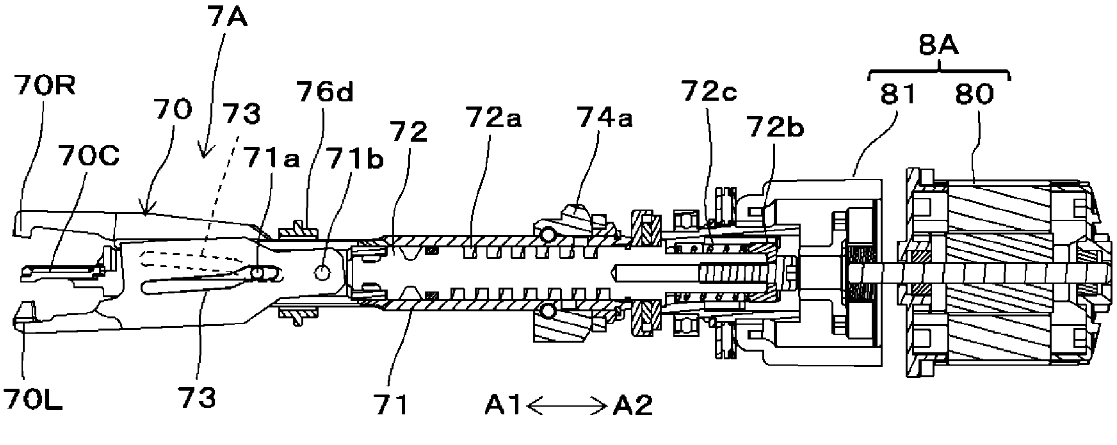
FIG. 2D is a sectional plan view depicting the example of the binding unit and the drive unit of the first embodiment.

FIG. 2A is a perspective view depicting an example of the binding unit and the drive unit of the first embodiment, FIG. 2B is a sectional perspective view of main parts depicting the example of the binding unit and the drive unit of the first embodiment, FIG. 2C is a sectional perspective view depicting the example of the binding unit and the drive unit of the first embodiment, and FIG. 2D is a sectional plan view depicting the example of the binding unit and the drive unit of the first embodiment.

The binding unit 7A includes a wire engaging body 70 to which the wire W is to be engaged, and a rotary shaft 72 for actuating the wire engaging body 70. The binding unit 7A and the drive unit 8A are configured so that the rotary shaft 72 and the motor 80 are connected each other via the decelerator 81 and the rotary shaft 72 is driven via the decelerator 81 by the motor 80.

The wire engaging body 70 has a center hook 70C connected to the rotary shaft 72, a first side hook 70l and a second side hook 70R configured to open and close with respect to the center hook 70C, and a sleeve 71 configured to actuate the first side hook 70L and the second side hook 70R and to form the wire W into a desired shape.

In the binding unit 7A, a side on which the center hook 70C, the first side hook 70L and the second side hook 70R are provided is referred to as a front side, and a side on which the rotary shaft 72 is connected to the decelerator 81 is referred to as a rear side.

The center hook 70C is connected to a front end of the rotary shaft 72, which is an end portion on one side, via a configuration that can rotate with respect to the rotary shaft 72 and move integrally with the rotary shaft 72 in an axis direction.

A tip end-side of the first side hook 70L, which is an end portion on one side in the axis direction of the rotary shaft 72, is positioned at a side part on one side with respect to the center hook 70C. A rear end-side of the first side hook 70L, which is an end portion on the other side in the axis direction of the rotary shaft 72, is rotatably supported to the center hook 70C by a shaft 71*b*.

A tip end-side of the second side hook 70R, which is an end portion on one side in the axis direction of the rotary shaft 72, is positioned at a side part on the other side with respect to the center hook 70C. A rear end-side of the second side hook 70R, which is an end portion on the other side in the axis direction of the rotary shaft 72, is rotatably supported to the center hook 70C by the shaft 71*b*.

Thereby, the wire engaging body 70 opens/closes in directions in which the tip end-side of the first side hook 70L separates and contacts with respect to the center hook 70C by a rotating operation about the shaft 71*b* as a support point. The wire engaging body 70 also opens/closes in directions in which the tip end-side of the second side hook 70R separates and contacts with respect to the center hook 70C.

A rear end of the rotary shaft 72, which is an end portion on the other side, is connected to the decelerator 81 via a connection portion 72*b* having a configuration that can cause the connection portion to rotate integrally with the decelerator 81 and to move in the axis direction with respect to the decelerator 81. The connection portion 72*b* has a spring 72*c* for urging backward the rotary shaft 72 toward the decelerator 81. Thereby, the rotary shaft 72 is configured to be movable forward away from the decelerator 81 while receiving a force pulled backward by the spring 72*c*.

The sleeve 71 has a convex portion (not shown) protruding from an inner peripheral surface of a space in which the rotary shaft 72 is inserted, and the convex portion enters a groove portion of a feeding screw 72*a* formed along the axis direction on an outer periphery of the rotary shaft 72. When the rotary shaft 72 rotates, the sleeve 71 moves in a front and rear direction along the axis direction of the rotary shaft 72 according to a rotation direction of the rotary shaft 72 by an action of the convex portion (not shown) and the feeding screw 72*a* of the rotary shaft 72. The sleeve 71 also rotates integrally with the rotary shaft 72.

The sleeve 71 has an opening/closing pin 71*a* configured to open/close the first side hook 70L and the second side hook 70R.

The opening/closing pin 71*a* is inserted into opening/closing guide holes 73 formed in the first side hook 70L and the second side hook 70R. The opening/closing guide hole 73 has a shape of extending in a moving direction of the sleeve 71 and converting linear motion of the opening/closing pin 71*a* configured to move in conjunction with the sleeve 71 into an opening/closing operation by rotation of the first side hook 70L and the second side hook 70R about the shaft 71*b* as a support point.

The wire engaging body 70 is configured so that, when the sleeve 71 is moved backward (refer to an arrow A2), the first side hook 70L and the second side hook 70R move away from the center hook 70C by the rotating operations about the shaft 71*b* as a support point, due to a locus of the opening/closing pin 71*a* and the shape of the opening/closing guide holes 73.

Thereby, the first side hook 70L and the second side hook 70R are opened with respect to the center hook 70C, so that a feeding path through which the wire. W is to pass is formed between the first side hook 70L and the center hook 70C and between the second side hook 70R and the center hook 70C.

In a state where the first side hook 70L and the second side hook 70R are opened with respect to the center hook 70C, the wire W that is fed by the wire feeding unit 3A passes between the center hook 70C and the first side hook 70L. The wire W passing between the center hook 70C and the first side hook 70L is guided to the curl forming unit 5A. Then, the wire curled by the curl forming unit 5A and guided to the binding unit 7A passes between the center hook 70C and the second side hook 70R.

The wire engaging body 70 is configured so that, when the sleeve 71 is moved in the forward direction denoted with an arrow A1, the first side hook 70L and the second side hook 70R move toward the center hook 70C by the rotating operations about the shaft 76 as a support point, due to the locus of the opening/closing pin 71*a* and the shape of the opening/closing guide holes 73. Thereby, the first side hook 70L and the second side hook 70R are closed with respect to the center hook 70C.

When the first side hook 70L is closed with respect to the center hook 70C, the wire W sandwiched between the first side hook 70L and the center hook 70C is engaged in such a manner that the wire can move between the first side hook 70L and the center hook 70C. Also, when the second side hook 70R is closed with respect to the center hook 70C, the wire W sandwiched between the second side hook 70R and the center hook 70C is engaged in such a manner that the wire cannot come oft between the second side hook 70R and the center book 70C.

The sleeve 71 has a bending portion 71*c*1 configured to push and bend a tip end-side (end portion on one side) of the wire W in a predetermined direction to form the wire W into a predetermined shape, and a bending portion 71*c*2 configured to push and bend a terminal end-side (end portion on the other side) of the wire W cut by the cutting unit 6A in a predetermined direction to form the wire W into a predetermined shape.

The sleeve 71 is moved in the forward direction denoted with the arrow A1, so that the tip end-side of the wire W engaged by the center hook 70C and the second side hook 70R is pushed and is bent toward the reinforcing bars S by the bending portion 71*c*. Also, the sleeve 71 is moved in the forward direction denoted with the arrow A1, so that the terminal end-side of the wire W engaged by the center hook 70C and the first side hook 70L and cut by the cutting unit 6A is pushed and is bent toward the reinforcing bars S by the bending portion 71*c*2.

The binding unit 7A includes a rotation regulation part 74 configured to regulate rotations of the wire engaging body 70 and the sleeve 71 in conjunction with the rotating operation of the rotary shaft 72. The rotation regulation part 74 has a rotation regulation blade 74*a* provided to the sleeve 71 and a rotation regulation claw 74*b* provided to the main body part 10A.

The rotation regulation blade 74*a* is configured by a plurality of convex portions protruding diametrically from an outer periphery of the sleeve 71 and provided with predetermined intervals in a circumferential direction of the sleeve 71. In the present example, the eight rotation regulation blades 74*a* are formed with intervals of 45°. The rotation regulation blades 74*a* are fixed to the sleeve 71 and are moved and rotated integrally with the sleeve 71.

The rotation regulation claw 74*b* has a first claw portion 74*b*1 and a second claw portion 74*b*2, as a pair of claw portions facing each other with an interval through which the rotation regulation blade 74*a* can pass. The first claw portion 74*b*1 and the second claw portion 74*b*2 are configured to be retractable from the locus of the rotation regulation blade 74*a* by being pushed by the rotation regulation blade 74*a* according to the rotation direction of the rotation regulation blade 74*a*.

In an operation area, in which the wire W is bent and formed by the bending portions 71c1 and 71c2 of the sleeve 71, of a first operation area where the wire W is engaged by the wire engaging body 70 and a second operation area until the wire W engaged by the wire engaging body 70 is twisted, the rotation regulation blade 74a of the rotation regulation part 74 is engaged to the rotation regulation claw 74b. Thereby, the rotation of the sleeve 71 in conjunction with the rotation of the rotary shaft 72 is regulated, so that the sleeve 71 is moved in the front and rear direction by the rotating operation of the rotary shaft 72. Also, in an operation area, in which the wire W is twisted, of the second operation area until the wire W engaged by the wire engaging body 70 is twisted, the rotation regulation blade 74a of the rotation regulation part 74 is disengaged from the rotation regulation claw 74b, so that the sleeve 71 is rotated in conjunction with the rotation of the rotary shaft 72. The center hook 70C, the first side hook 70L and the second side hook 70R of the wire engaging body 70 engaging the wire W are rotated in conjunction with the rotation of the sleeve 71.

The binding unit 7A includes a tension applying part 75A configured to move the wire engaging body 70 to apply tension to the wire W and to release the applied tension. The tension applying part 75A of the first embodiment has a first projection 76a provided to the sleeve 71 and a second projection 76b provided on the main body part 10A-side.

The first projection 76a is provided on the rotation regulation blade 74a-side, and protrudes from the outer periphery of the sleeve 71. The first projection 76a is fixed to the sleeve 71 and moves and rotates integrally with the sleeve 71. Note that, the first projection 76a may have a configuration where a component separate from the sleeve 71 is fixed to the sleeve 71, or may be formed integrally with the sleeve 71.

The first projection 76a has an acting surface 76c formed on a surface along the rotation direction of the sleeve 71. The acting surface 76c is configured by a surface inclined with respect to the rotation direction of the sleeve 71.

The second projection 76b is provided to a support frame 76d configured to support the sleeve 71 so as to be rotatable and slidable in the axis direction. The support frame 76d is an annular member, and is attached to the main body part 10A in such a manner that it cannot rotate in the circumferential direction and cannot move in the axis direction.

The support frame 76d is configured to support a part of the sleeve 71 between a side on which the center book 70C, the first side hook 70L and the second side hook 70R are provided and a side on which the first projection 76a is provided so as to be rotatable and slidable according to a position of the sleeve 71 moving in the axis direction of the rotary shaft 72.

The second projection 76b protrudes backward toward the first projection 76a along the outer peripheral surface of the sleeve 71 supported by the support frame 76d. The second projection 76b has an acted surface 76e formed on a surface along the rotation direction of the sleeve 71. The acted surface 76e is configured by a surface inclined with respect to the rotation direction of the sleeve 71.

In a state where the sleeve 71 is located at a standby position, positions of the first projection 76a and the second projection 76b in the rotation direction of the sleeve 71 face each other in the axis direction of the rotary shaft 72. In the state where the sleeve 71 is located at the standby position, positions of the first projection 76a and the second projection 76b in the axis direction of the rotary shaft 72 face each other with a predetermined interval at which the projections are not contacted.

In an operation area where the sleeve 71 moves forward from the standby position without rotating, the positions of the first projection 76a and the second projection 76b in the rotation direction of the sleeve 71 are kept facing each other in the axis direction of the rotary shaft 72. Also, in the operation area where the sleeve 71 moves forward from the standby position without rotating, the first projection 76a and the second projection 76b come close to each other in the axis direction of the rotary shaft 72.

The operation area where the sleeve 71 moves forward from the standby position without rotating is an operation area, in which the wire W is bent by the bending portions 71c1 and 71c2 of the sleeve 71, of the first operation area where the wire W is engaged by the wire engaging body 70 and the second operation area after the wire W is engaged by the wire engaging body 70 until the wire W is twisted.

In an operation area where the sleeve 71 rotates, the positions of the first projection 76a and the second projection 76b in the rotation direction of the sleeve 71 are changed. The operation area where the sleeve 71 rotates is an operation area, in which the wire W engaged by the wire engaging body 70 is twisted, of the second operation area, and in the operation area where the wire W is twisted, a force of moving forward the wire engaging body 70 in the axis direction is applied.

The rotary shaft 72 for rotating and moving the wire engaging body 70 in the axis direction is connected to the decelerator 81 via the connection portion 72b having a configuration that can cause the rotary shaft 72 to move in the axis direction. Thereby, when a force for moving forward in the axis direction is applied to the wire engaging body 70, the rotary shaft 72 can be moved forward away from the decelerator 81 while receiving the force pushed backward by the spring 72c.

As for the first projection 76a and the second projection 76b, when the sleeve 71 rotates, the position of the first projection 76a in the rotation direction of the sleeve 71 deviates from the position facing the second projection 76 in the axis direction of the rotary shaft 72.

When the positions of the first projection 76a and the second projection 76b in the rotation direction of the sleeve 71 deviate from each other, the sleeve 71 can move forward up to a position at which the position of the first projection 76a in the axis direction of the rotary shaft 72 overlaps the second projection 76b.

Thereby, when the sleeve 71 rotates, the first projection 76a gets over the second projection 76b, so that the wire engaging body 70 and the rotary shaft 72 can move backward in the axis direction of the rotary shaft 72 by a predetermined amount and again move forward.

<Example of Operation of Reinforcing Bar Binding Machine>

Subsequently, an operation of binding the reinforcing bars S with the wire W by the reinforcing bar binding machine 1A is described with reference to the respective drawings.

The reinforcing bar binding machine 1A is in a standby state where the wire W is sandwiched between the pair of feeding gears 30 and the tip end of the wire W is positioned between the sandwiched position by the feeding gear 30 and the fixed blade part 60 of the cutting unit 6A. Also, as shown in FIG. 2A, when the reinforcing bar binding machine 1A is in the standby state, the first side hook 70L is opened with respect to the center hook 70C and the second side hook 70R is opened with respect to the center hook 70C.

When the reinforcing bars S are inserted between the curl guide 50 and the induction guide 51A of the curl forming unit 5A and the trigger 12A is operated, the feeding motor (not shown) is driven in the forward rotation direction, so that the wire W is fed in the forward direction denoted with the arrow F by the wire feeding unit 3A.

In a configuration where a plurality of, for example, two wires W are fed, the two wire W are fed aligned in parallel along an axis direction of the loop Ru, which is formed by the wires W, by a wire guide (not shown).

The wire W fed in the forward direction passes between the center hook 70C and the first side hook 70L and is then fed to the curl guide 50 of the curl forming unit 5A. The wire W passes through the curl guide 50, so that it is curled to be wound around the reinforcing bars S.

The wire W curled by the curl guide 50 is guided to the induction guide 51 and is further fed in the forward direction by the wire feeding unit 3A, so that the wire is guided between the center hook 70C and the second side hook 70R by the induction guide 51. The wire W is fed until the tip end is butted against the feeding regulation part 90. When the wire W is fed to a position at which the tip end is butted against the feeding regulation part 90, the drive of the feeding motor (not shown) is stopped.

After the feeding of the wire W in the forward direction is stopped, the motor 80 is driven in the forward rotation direction. In the first operation area where the wire W is engaged by the wire engaging body 70, the rotation regulation blade 74*a* is engaged to the rotation regulation claw 74*b*, so that the rotation of the sleeve 71 in conjunction with the rotation of the rotary shaft 72 is regulated. Thereby, the rotation of the motor 80 is converted into linear movement, so that the sleeve 71 is moved in the forward direction denoted with the arrow A1.

When the sleeve 71 is moved in the forward direction, the opening/closing pin 71*a* passes through the opening/closing guide holes 73. Thereby, the first side hook 70L is moved toward the center hook 70C by the rotating operation about the shaft 71*b* as a support point. When the first side hook 70L is closed with respect to the center hook 70C, the wire W sandwiched between the first side hook 70L and the center hook 70C is engaged in such a manner that the wire can move between the first side hook 70L and the center hook 70C.

Also, the second side hook 70R is moved toward the center hook 70C by the rotating operation about the shaft 71*b* as a support point. When the second side hook 70R is closed with respect to the center hook 70C, the wire W sandwiched between the second side hook 70R and the center hook 70C is engaged is in such a manner that the wire cannot come off between the second side hook 70R and the center hook 70C.

After the sleeve 71 is advanced to a position at which the wire W is engaged by the closing operation of the first side hook 70L and the second side hook 70R, the rotation of the motor 80 is temporarily stopped and the feeding motor (not shown) is driven in the reverse rotation direction. Thereby, the pair of feeding gears 30 is driven in the reverse rotation direction.

Therefore, the wire W sandwiched between the pair of feeding gears 30 is fed in the reverse direction denoted with the arrow R. Since the tip end-side of the wire W is engaged in such a manner that the wire cannot come off between the second side hook 70R and the center hook 70C, the wire W is wound on the reinforcing bars S by the operation of feeding the wire W in the reverse direction.

After the wire W is wound on the reinforcing bars S and the drive of the feeding motor (not shown) in the reverse rotation direction is stopped, the motor 80 is driven in the forward rotation direction, so that the sleeve 71 is moved in the forward direction denoted with the arrow A1. The forward movement of the sleeve 71 is transmitted to the cutting unit 6A by the transmission mechanism 62, so that the movable blade part 61 is rotated and the wire W engaged by the first side hook 70L and the center hook 70C is cut by the operation of the fixed blade part 60 and the movable blade part 61.

The bending portions 71*c*1 and 71*c*2 are moved toward the reinforcing bars S substantially at the same time when the wire W is cut. Thereby, the tip end-side of the wire W engaged by the center hook 70C and the second side hook 70R is pressed toward the reinforcing bars S and bent toward the reinforcing bars S at the engaging position as a support point by the bending portion 71*c*1. The sleeve 71 is further moved in the forward direction, so that the wire W engaged between the second side hook 70R and the center hook 70C is sandwiched and maintained by the bending portion 71*c*1.

Also, the terminal end-side of the wire W engaged by the center hook 70C and the first side hook 70L and cut by the cutting unit 6A is pressed toward the reinforcing bars S and bent toward the reinforcing bars S at the engaging point as a support point by the bending portion 71*c*2. The sleeve 71 is further moved in the forward direction, so that the wire W engaged between the first side hook 70L and the center hook 70C is sandwiched and maintained by the bending portion 71*c*2.

Figure 3A:
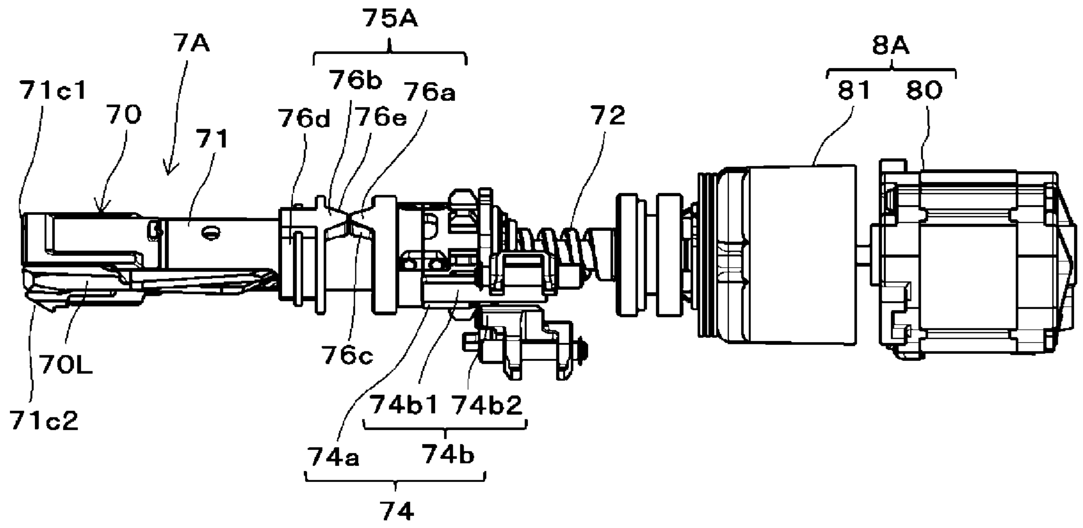
FIG. 3A is a perspective view depicting an example of operations of the binding unit and the drive unit of the first embodiment.
Figure 3B:
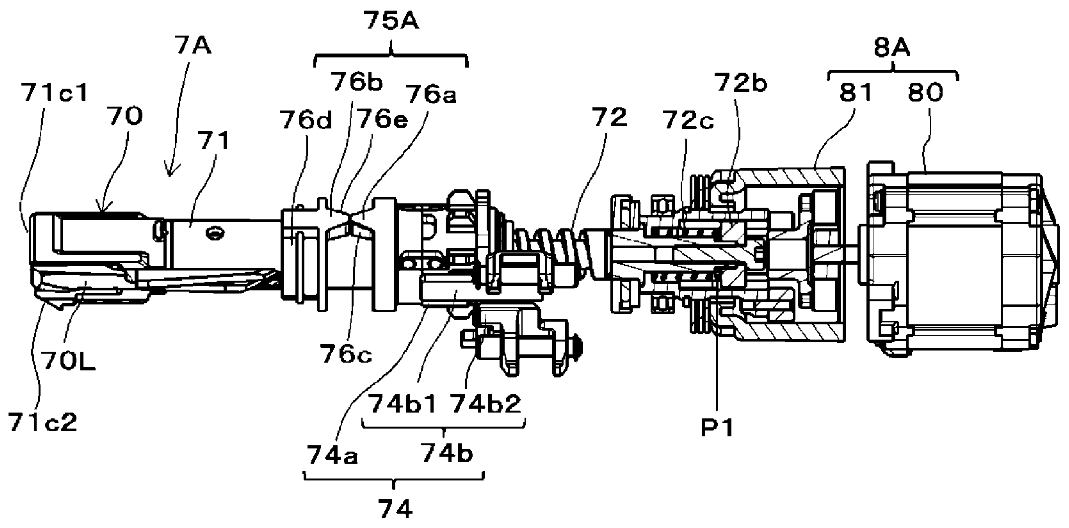
FIG. 3B is a sectional perspective view of main parts depicting the example of operations of the binding unit and the drive unit of the first embodiment.
Figure 3C:
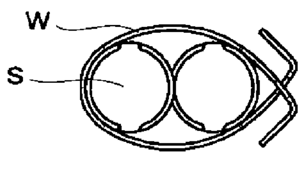
FIG. 3C illustrates an example of a wire form during a binding process.

FIG. 3A is a perspective view depicting an example of operations of the binding unit and the drive unit of the first embodiment, FIG. 3B is a sectional perspective view of main parts depicting the example of operations of the binding unit and the drive unit of the first embodiment, and FIG. 3C illustrates an example of a wire form during a binding process.

In the operation area where the sleeve 71 moves forward without rotating, the binding unit 7A is kept in the state where the positions of the first projection 76*a* and the second projection 76*b* in the rotation direction of the sleeve 71 face each other in the axis direction of the rotary shaft 72, as shown in FIGS. 3A and 3B. In the binding unit 7A, in the operation area where the sleeve 71 moves forward without rotating, the first projection 76*a* and the second projection 76*b* become close to each other in the axis direction of the rotary shaft 72. Further, in the binding unit 7A, in the operation area where the sleeve 71 moves forward without rotating, the rotary shaft 72 is pushed backward by the spring 72*c* and is located at a first position P1, as shown in FIG. 3B.

As shown in FIG. 3C, the wire W is bent toward the reinforcing bars S on the tip end-side of the wire W engaged by the center hook 70C and the second side hook 70R and on the terminal end-side of the wire W engaged by the center hook 70C and the first side hook 70L.

After the tip end-side and the terminal end-side of the wire W are bent toward the reinforcing bars S, the motor 80 is further driven in the forward rotation direction, so that the sleeve 71 is further moved in the forward direction. When the sleeve 71 is moved to a predetermined position and reaches the operation area where the wire W engaged by the wire engaging body 70 is twisted, the engaging of the rotation regulation blade 74*a* with the rotation regulation claw 74*b* is released.

Thereby, the motor 80 is further driven in the forward rotation direction, so that the wire engaging body 70 is rotated in conjunction with the rotary shaft 72, thereby twisting the wire W.

Figure 4A:
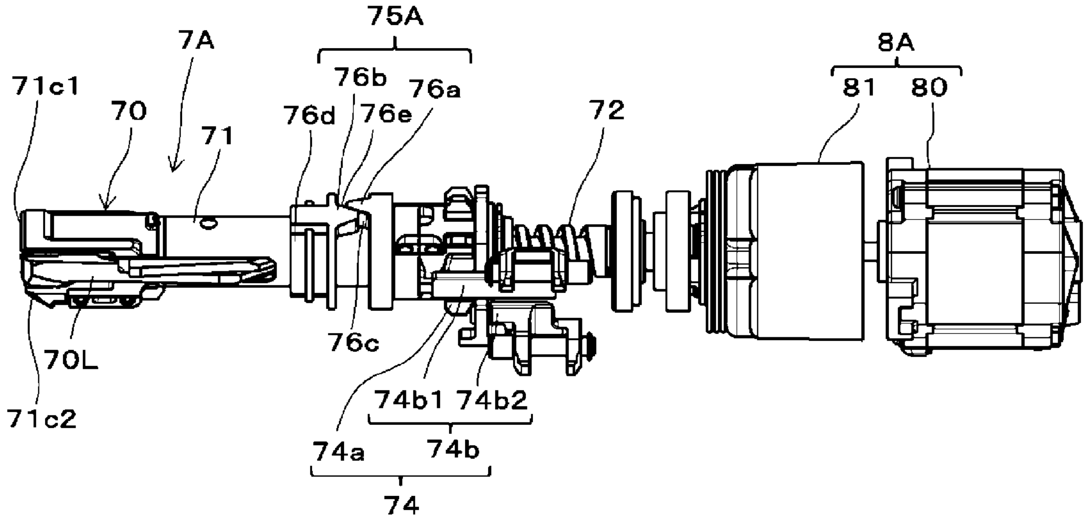
FIG. 4A is a perspective view depicting an example of operations of the binding unit and the drive unit of the first embodiment.
Figure 4B:
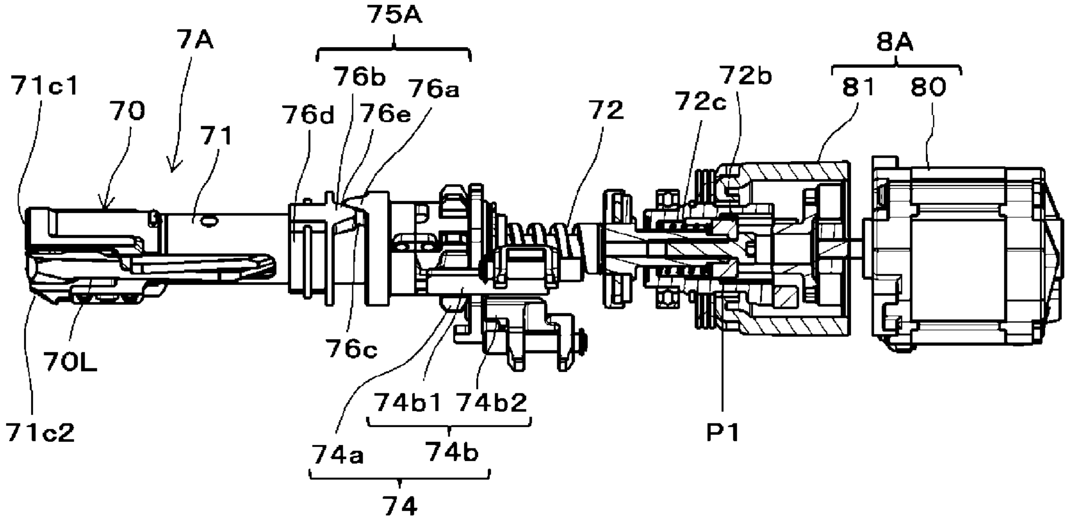
FIG. 4B is a sectional perspective view of main parts depicting the example of operations of the binding unit and the drive unit of the first embodiment.
Figure 4C:
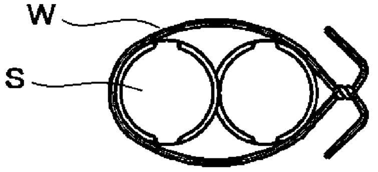
FIG. 4C illustrates an example of a wire form during the binding process.

FIG. 4A is a perspective view depicting an example of operations of the binding unit and the drive unit of the first embodiment, FIG. 4B is a sectional perspective view of main parts depicting the example of operations of the binding unit and the drive unit of the first embodiment, and FIG. 4C illustrates an example of a wire form during the binding process.

In the binding unit 7A, in the operation area where the sleeve 71 rotates, the sleeve 71 rotates, so that the position of the first projection 76*a* in the rotation direction of the sleeve 71 deviates from the position facing the second projection 76*b* in the axis direction of the rotary shaft 72, as shown in FIGS. 4A and 4B.

Also, in the binding unit 7A, in the operation area where the sleeve 71 rotates, the reinforcing bar are butted against the butting part 91, so that the backward movement of the reinforcing bars S toward the binding unit. 7A is regulated. Therefore, as shown in FIG. 4C, the wire W is twisted, so that a force of pulling the wire engaging body 70 forward along the axis direction of the rotary shaft 72 is applied.

When the force of moving the wire engaging body 70 forward along the axis direction of the rotary shaft 72 for rotating and moving the wire engaging body 70 in the axis direction is applied to the wire engaging body 70, the rotary shaft 72 can move forward from the first position P1 away from the decelerator 81 while receiving a force pushed backward by the spring 72*c*, as shown in FIG. 4B.

Thereby, in the binding unit 7A, in the operation area where the sleeve 71 rotates, the wire engaging body 70 and the rotary shaft 72 move forward toward the butting part 91 up to a position at which the position of the first projection 76*a* in the axis direction of the rotary shaft 72 overlaps the second projection 76*b*, and the sleeve 71 rotates, so that the acting surface 76*c* of the first projection 76*a* and the acted surface 76*e* of the second projection 76*b* are contacted to each other.

Figure 5A:
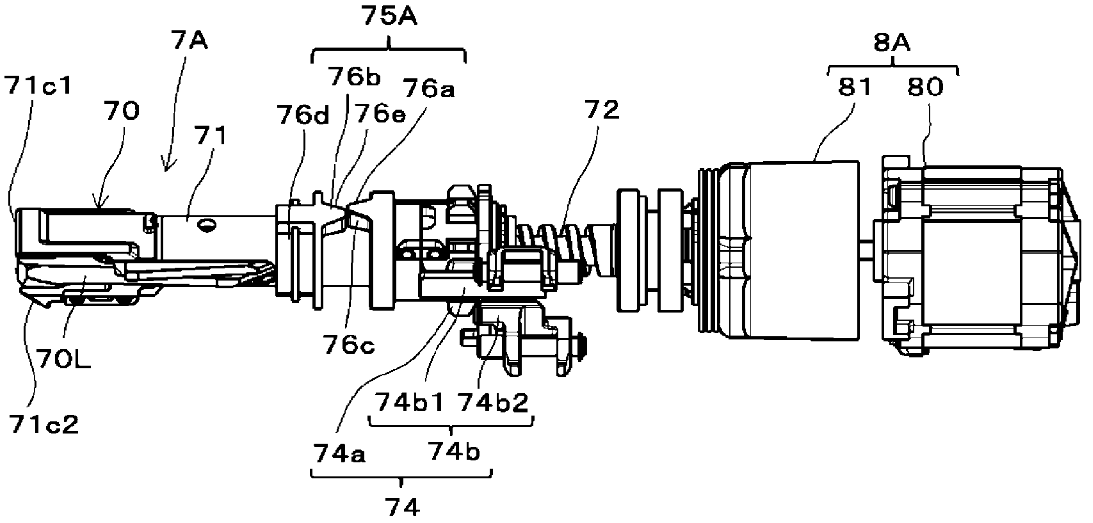
FIG. 5A is a perspective view depicting an example of operations of the binding unit and the drive unit of the first embodiment.
Figure 5B:
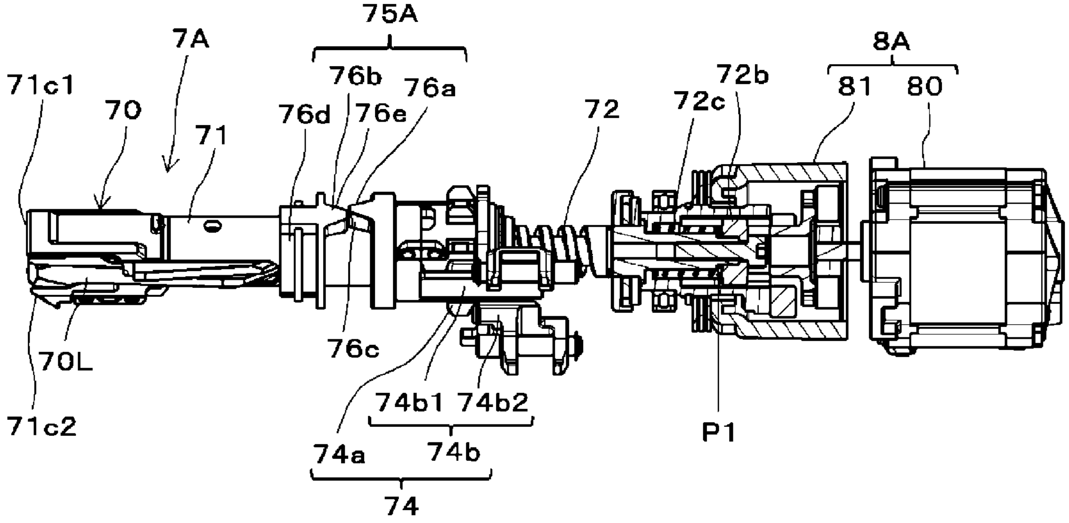
FIG. 5B is a sectional perspective view of main parts depicting the example of operations of the binding unit and the drive unit of the first embodiment.
Figure 5C:
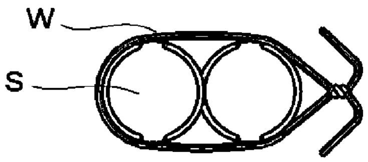
FIG. 5C illustrates an example of a wire form during the binding process.

FIG. 5A is a perspective view depicting an example of operations of the binding unit and the drive unit of the first embodiment, FIG. 5B is a sectional perspective view of main parts depicting the example of operations of the binding unit and the drive unit of the first embodiment, and FIG. 5C illustrates an example of a wire form during the binding process.

When the sleeve 71 is further rotated from the state where the acting surface 76*c* of the first projection 76*a* and the acted surface 76*e* of the second projection 76*b* are in contact with each other, the binding unit 7A is applied with a backward moving force in a direction in which the first projection 76*a* runs on the second projection 76*b*. Thereby, the wire engaging body 70 and the rotary shaft 72 of the binding unit 7A are moved backward away from the butting part 91 by a length of the second projection 76*b* in the axis direction of the rotary shaft 72, as shown in FIGS. 5A and 5B.

The wire engaging body 70 and the rotary shaft 72 are moved backward in the axis direction of the rotary shalt 72 by the predetermined amount, so that a portion of the wire W engaged by the wire engaging body 70 is pulled backward. Thereby, as shown in FIG. 5C, the wire W is applied with tension in tangential directions of the reinforcing bars S and is pulled to closely contact the reinforcing bars S. A length of the first projection 76*a*, a length of the second projection 76*b* and the like are set so that the tension applied to the wire W is equal to or larger than 10% and equal to or smaller than 50% with respect to the maximum tensile load of the wire W. When the tension applied to the wire W is equal to or larger than 10% and equal to or smaller than 50% with respect to the maximum tensile load of the wire W, the loosening due to an extra part of the wire can be removed, the wire W can be closely contacted to the reinforcing bars S, and the wire W can be prevented from being carelessly cut. In addition, it is possible to suppress the unnecessarily high outputs of the motor 80 and the feeding motor (not shown). Therefore, it is possible to suppress increases in a size of the motor and a size of the entire device so as to make the device sturdy, which leads to improvement on a handling property as a product. The maximum tensile load of a wire means the maximum load that the wire cam withstand in a tensile test.

Figure 6A:
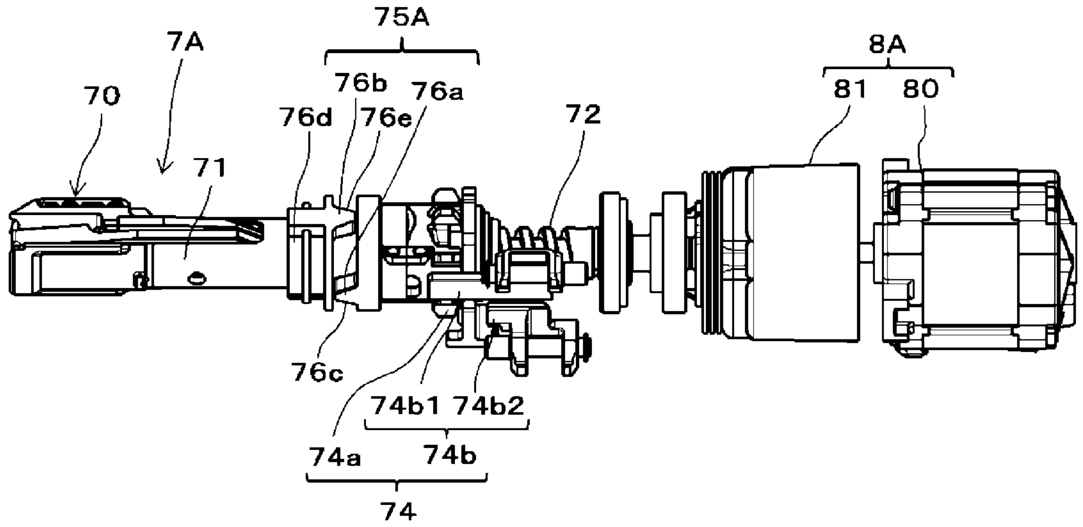
FIG. 6A is a perspective view depicting an example of operations of the binding unit and the drive unit of the first embodiment.
Figure 6B:
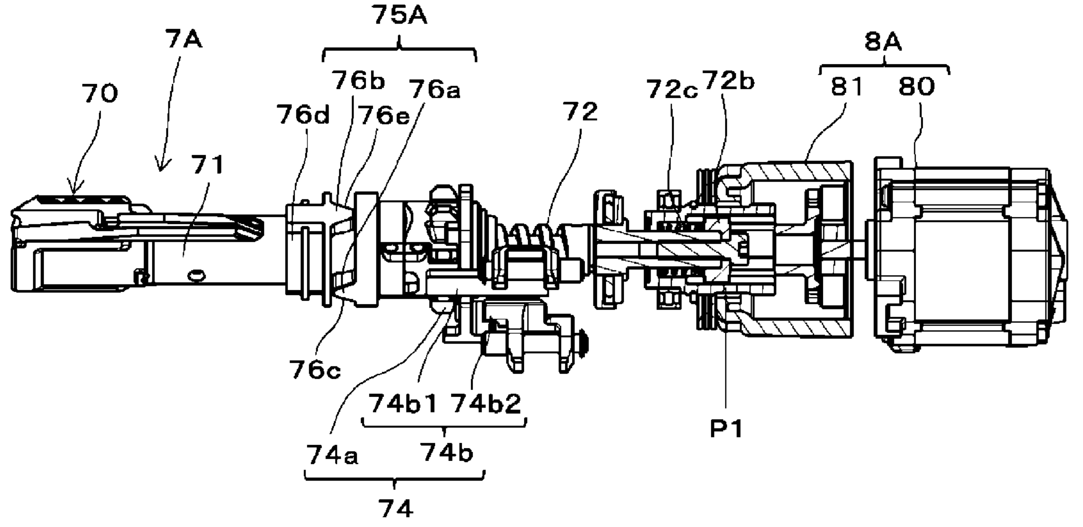
FIG. 6B is a sectional perspective view of main parts depicting the example of operations of the binding unit and the drive unit of the first embodiment.
Figure 6C:
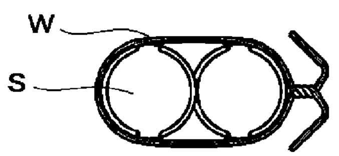
FIG. 6C illustrates an example of a wire form during the binding process.

FIG. 6A is a perspective view depicting an example of operations of the binding unit and the drive unit of the first embodiment, FIG. 6B is a sectional perspective view of main parts depicting the example of operations of the binding unit and the drive unit of the first embodiment, and FIG. 6C illustrates an example of a wire form during the binding process.

In the binding unit 7A, when the sleeve 71 further rotates and thus the first projection 76*a* gets over the second projection 76*b*, the wire engaging body 70 and the rotary shaft 72 can again move forward while receiving a force pushed backward by the spring 72*c*, as shown in FIGS. 6A and 6B.

Thereby, the tension applied to the wire W is released. Also, in the binding unit 7A, when the wire engaging body 70 rotates in conjunction with the rotary shaft 72, the wire engaging body 70 and the rotary shaft 72 moves in the forward direction in which a gap between the twisted portion of the wire W and the reinforcing bar S becomes smaller, thereby further twisting the wire W.

Therefore, the wire W is twisted as the wire engaging body 70 and the rotary shaft 72 are moved forward with receiving the force pushed backward by the spring 72*c*, so that the gap between the twisted portion of the wire W and the reinforcing bars S is reduced and the wire is closely contacted to the reinforcing bar S in a manner of following the reinforcing bar S, as shown in FIG. 6C.

When it is detected that a maximum load is applied to the motor 80 as a result of twisting of the wire W, the rotation of the motor 80 in the forward direction is stopped. Then, the motor 80 is driven in the reverse rotation direction, so that the rotary shaft 72 is reversely rotated. When the sleeve 71 is reversely rotated according to the reverse rotation of the rotary shaft 72, the rotation regulation blade 74*a* is engaged to the rotation regulation claw 74*b*, so that the rotation of the sleeve 71 in conjunction with the rotation of the rotary shaft 72 is regulated. Thereby, the sleeve 71 is moved in the backward direction denoted with the arrow A2.

When sleeve 71 is moved backward, the bending portions 71*c*1 and 71*c*2 separate from the wire W and the engaged state of the wire W by the bending portions 71*c*1 and 71*c*2 is released. Also, when the sleeve 71 is moved backward, the opening/closing pin 71*a* passes through the opening/closing guide holes 73. Thereby, the first side hook 70L is moved away from the center hook 70C by the rotating operation about the shaft 71*b* as a support point. The second side hook 70R is also moved away from the center hook 70C by the rotating operation about the shaft 71*b* as a support point. Thereby, the wire W comes off from the wire engaging body 70. Note that, the first projection 76*a* and the second projection 76*b* may also be configured so that the positions thereof in the rotation direction of the sleeve 71 do not face each other in the axis direction of the rotary shaft 72 in the state where the sleeve 71 is located at the standby position. In addition, the acting surface 76*c* of the first projection 76*a* and the acted surface 76*e* of the second projection 76*b* may be in contact with each other, and the first projection 76*a* may get over the second projection 76*b* several times.

Figure 7:
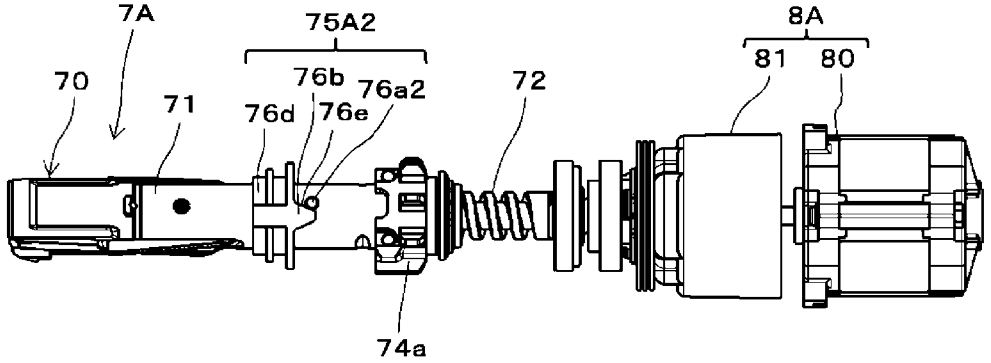
FIG. 7 is a perspective view depicting a modified embodiment of a tension applying part of the first embodiment.

FIG. 7 is a perspective view depicting a modified embodiment of the tension applying pan of the first embodiment. In the modified embodiment, a tension applying part 75A2 has a first projection 76*a*2 provided to the sleeve 71 and a second projection 76*b* provided on the main body part 10A-side. The first projection 76*a*2 is configured by a pillar-shape member such as a cylindrical pin protruding from the outer peripheral surface of the sleeve 71. Even with this configuration, in the operation area where the sleeve 71 rotates, the first projection 76*a*2 gets over the second projection 76*b*, so that a portion of the wire W engaged by the wire engaging body 70 is pulled backward. Thereby, as shown in FIG. 5C, the wire W is applied with tension in the tangential directions of the reinforcing bars S and is pulled to closely contact the reinforcing bars S.

<Configuration Example of Binding Unit and Drive Unit of Second Embodiment>

Figure 8A:
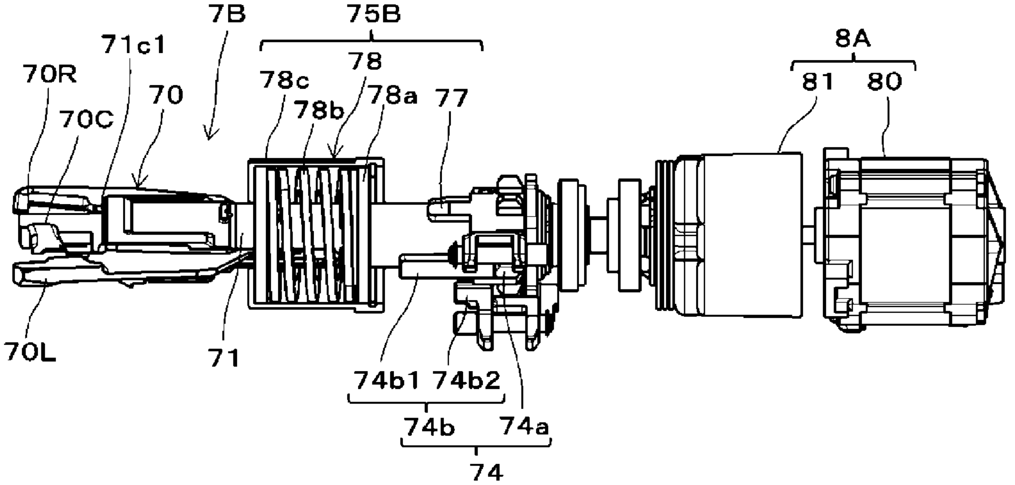
FIG. 8A is a perspective view depicting an example of a binding unit and a drive unit of a second embodiment.
Figure 8B:
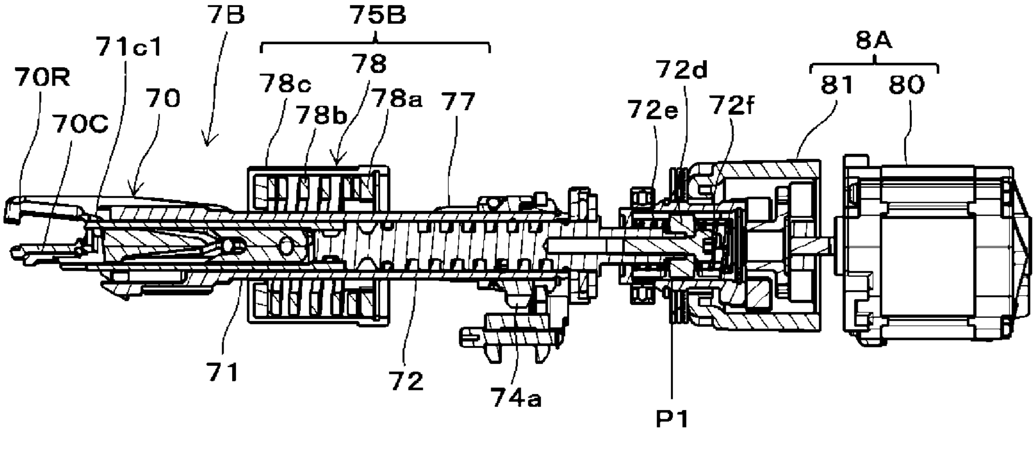
FIG. 8B is a sectional perspective view depicting the example of the binding unit and the drive unit of the second embodiment.

FIG. 8A is a perspective view depicting an example of a binding unit and a drive unit of a second embodiment, and FIG. 8B is a sectional perspective view depicting the example of the binding unit and the drive unit of the second embodiment. Note that, as for the binding unit and the drive unit of the second embodiment, the same configurations as the binding unit and the drive unit of the first embodiment are denoted with the same reference signs, and the detailed descriptions thereof are omitted.

A binding unit 7B includes a tension applying part 75B configured to move the wire engaging body 70, thereby applying tension to the wire W. The tension applying part 75B of the second embodiment has a projection 77 provided to the sleeve 71 and a position regulation part 78 provided on the main body part 10A-side.

The projection 77 is provided on the rotation regulation blade 74*a*-side, and protrudes from the outer periphery of the sleeve 71. The projection 77 is fixed to the sleeve 71 and moves and rotates integrally with the sleeve 71. Note that, the projection 77 may have a configuration where a component separate from the sleeve 71 is fixed to the sleeve 71, or may be formed integrally with the sleeve 71.

Figure 9A:
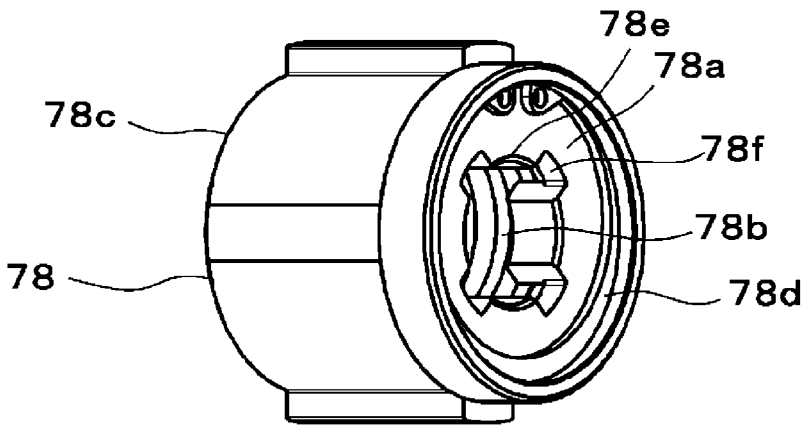
FIG. 9A is a perspective view depicting an example of a position regulation part.
Figure 9B:
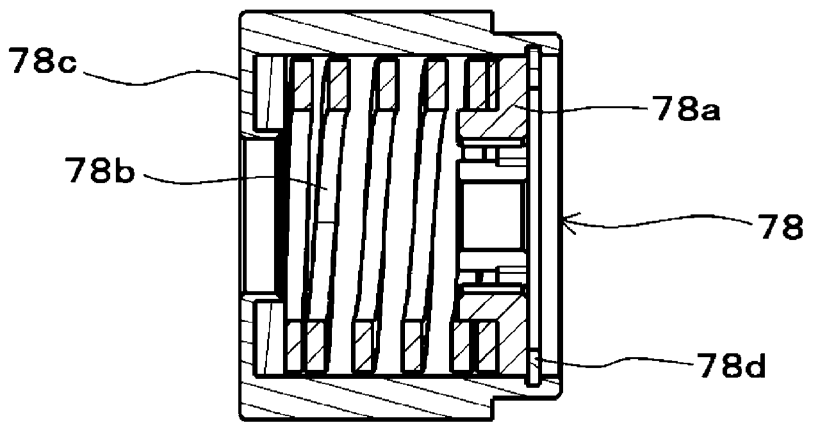
FIG. 9B is a sectional side view depicting the example of the position regulation part.
Figure 9C:
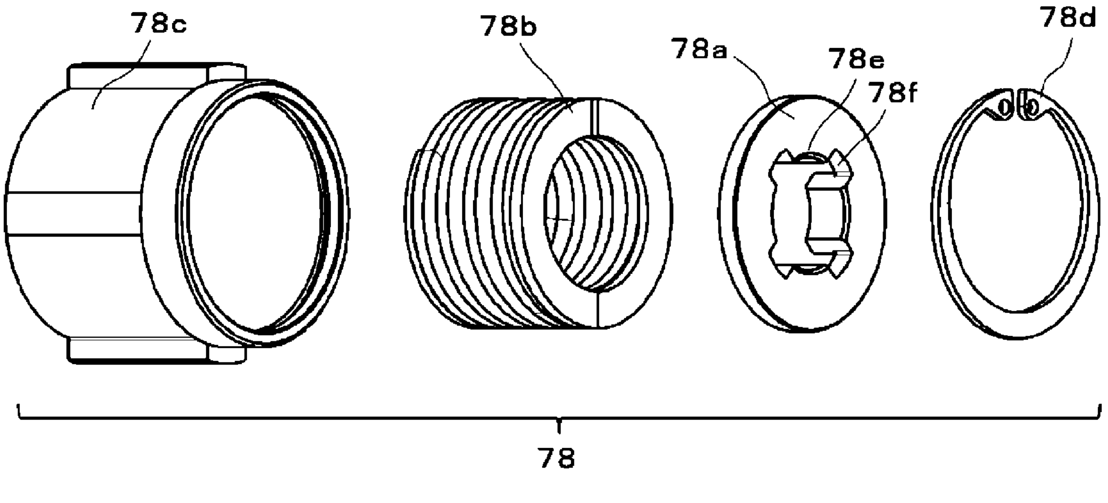
FIG. 9C is an exploded perspective view depicting the example of the position regulation part.

FIG. 9A is a perspective view depicting an example of the position regulation part, FIG. 9B is a sectional side view depicting the example of the position regulation part, and FIG. 9C is an exploded perspective view depicting the example of the position regulation part.

The position regulation part 78 includes a regulation plate 78*a* configured to regulate a position of the sleeve 71 via the projection 77, a position regulation spring 78*b* for pressing the regulation plate 78*a*, a case 78*c* in which the regulation plate 78*a* and the position regulation spring 78*b* are housed, and a ring 78*d* configured to engage the regulation plate 78*a* to the case 78*c*.

An inner periphery of a hole part of the regulation plate 78*a*, in which the sleeve 71 is inserted, is formed with a convex portion 78*e* against which the projection 77 is butted and a concave portion 78*f* in which the projection 77 enters. The position regulation spring 78*b* is configured by a compression coil spring, and urges the regulation plate 78*a* backward in a direction facing the projection 77. The case 78*c* is configured to support the regulation plate 78*a* so as to be rotatable and to be movable in the axis direction that is an urging direction by the position regulation spring 78*b*. The ring 78*d* is configured to regulate separation of the regulation plate 78*a* from the case 78*c* due to the urging by the position regulation spring 78*b*.

The position regulation part 78 is attached to the main body part 10A in such a manner that the case 78*c* cannot rotate in the circumferential direction and cannot move in the axis direction.

The position regulation part 78 is configured to rotatably and slidably support a part of the sleeve 71 between the side on which the center hook 70C, the first side hook 70L and the second side hook 70R are provided and the side on which the projection 77 is provided according to a position of the sleeve 71 moving in the axis direction of the rotary shaft 72.

In the state where the sleeve 71 is located at the standby position, the projection 77 is provided at a position at which a position thereof in the rotation direction of the sleeve 71 faces the convex portion 78*e* of the regulation plate 78*a* of the position regulation part 78 in the axis direction of the rotary shaft 72. Also, in the state where the sleeve 71 is located at the standby position, the projection 77 is provided at a position at which a position thereof in the axis direction of the rotary shaft 72 faces the convex portion 78*e* of the regulation plate 78*a* of the position regulation part 78 with a predetermined interval at which the projection is not contacted.

In the operation area where the sleeve 71 moves forward from the standby position without rotating, the position of the projection 77 in the rotation direction of the sleeve 71 is kept facing the convex portion 78*e* of the regulation plate 78*a* of the position regulation part 78 in the axis direction of the rotary shaft 72. Also, in the operation area where the sleeve 71 moves forward from the standby position without rotating, the position of the projection 77 in the axis direction of the rotary shaft 72 comes close to and is butted against the convex portion 78*e* of the regulation plate 78*a* of the position regulation part 78.

The operation area where the sleeve 71 moves forward from the standby position without rotating is an operation area, in which the wire W is bent by the bending portions 71*c*1 and 71*c*2 of the sleeve 71, of the first operation area where the wire W is engaged by the wire engaging body 70 and the second operation area after the wire W is engaged by the wire engaging body 70 until the wire W is twisted.

In the operation area where the sleeve 71 rotates, the position of the projection 77 in the rotation direction of the sleeve 71 is changed with respect to the convex portion 78*e* of the regulation plate 78*a* of the position regulation part 78 and faces the concave portion 78*f* of the regulation plate 78*a*. The operation area where the sleeve 71 rotates is an operation area, in which the wire W engaged by the wire engaging body 70 is twisted, of the second operation area, and in the operation area where the wire W is twisted, a force of moving the wire engaging body 70 forward in the axis direction is applied.

The rotary shaft 72 for rotating and moving the wire engaging body 70 in the axis direction is connected to the decelerator 81 via a connection portion 72*d* having a configuration that can cause the rotary shaft 72 to move in the axis direction. The connection portion 72*d* has a first spring 72*e* for pushing backward the rotary shaft 72 and a second spring 72*f* for pushing forward the rotary shaft 72. A position of the rotary shaft 72 in the axis direction is defined to a position at which forces of the first spring 72*e* and the second spring 72*f* are balanced.

Thereby, the rotary shaft 72 is configured so that, when the projection 77 of the tension applying part. 75B is butted against the convex portion 78*e* of the regulation plate 78*a* of the position regulation part 78 in the operation area where the sleeve 71 moves forward from the standby position without rotating, the forward movement of the sleeve 71 is regulated by the spring 78*b* and the rotary shaft 72 can move backward while compressing the second spring 72*f*.

The rotary shaft 72 is also configured so that, when the projection 77 of the tension applying part 75B faces the convex portion 78*e* of the regulation plate 78*a* of the position regulation part 78 in the operation area where the sleeve 71 rotates, the forward movement regulation of the sleeve 71 by the spring 78*b* is released, the force of moving the rotary shalt forward in the axis direction is applied to the wire engaging body 70 and the rotary shaft 72 can move forward while receiving a force pushed backward by the first spring 72*e*.

<Example of Operations of Binding Unit and Drive Unit of Second Embodiment>

Subsequently, operations of binding the reinforcing bars S with the wire W by the binding unit 7B and the drive unit 8A of the second embodiment are described. Note that, the operation of feeding the wire W in the forward direction and winding the wire around the reinforcing bars S by the curl forming unit 5A, the operation of engaging the wire W by the wire engaging body 70, the operation of feeding the wire W in the reverse direction and winding the wire on the reinforcing bars S and the operation of cutting the wire W are the same as the operations of the reinforcing bar binding machine 1A.

Figure 10A:
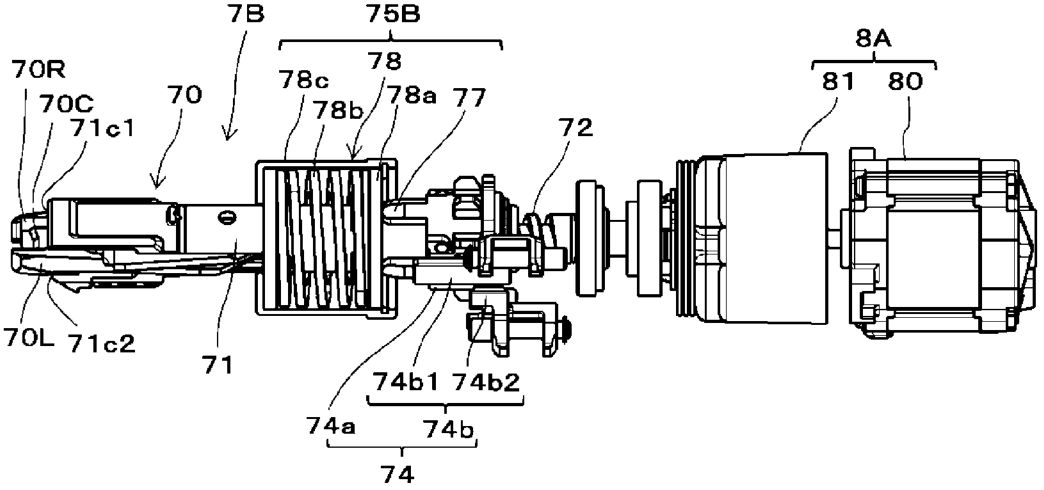
FIG. 10A is a perspective view depicting an example of operations of the binding unit and the drive unit of the second embodiment.
Figure 10B:
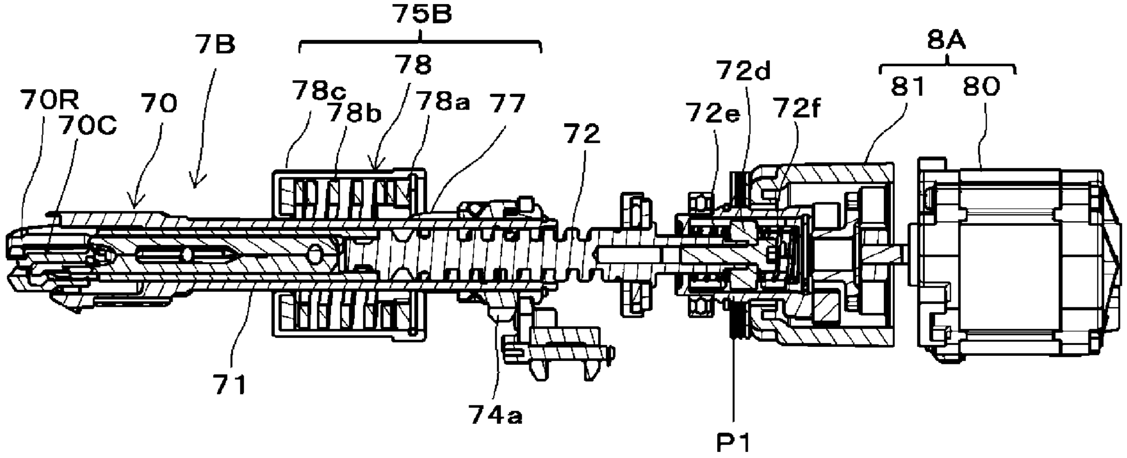
FIG. 10B is a sectional perspective view depicting the example of operations of the binding unit and the drive unit of the second embodiment.

FIG. 10A is a perspective view depicting an example of operations of the binding unit and the drive unit of the second embodiment. FIG. 10B is a sectional perspective view depicting the example of operations of the binding unit and the drive unit of the second embodiment, and FIG. 10C illustrates an example of a wire form during the binding process.

In the operation area where the sleeve 71 moves forward from the standby position without rotating, the binding unit 7B is kept in a state where the position of the projection 77 in the rotation direction of the sleeve 71 faces the convex portion 78*e* (FIG. 9A and the like) of the regulation plate 78*a* of the position regulation part 78 in the axis direction of the rotary shaft 72, as shown in FIGS. 10A and 10B. In the binding unit. 7B, in the operation area where the sleeve 71 moves forward without rotating, the position of the projection 77 in the axis direction of the rotary shaft 72 comes close to and is butted against the convex portion 78*e* of the regulation plate 78*a* of the position regulation part 78. Further, in the binding unit 7B, in the operation area where the sleeve 71 moves forward without rotating, the rotary shaft 72 is located at the first position P1 due to the balance of the first spring 72*e* and the second spring 77*f*, as shown in FIG. 10B.

Figure 10C:
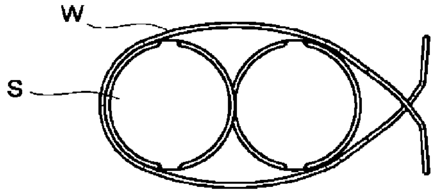
FIG. 10C illustrates an example of a wire form during the binding process.

As shown in FIG. 10C, the wire W is bent toward the reinforcing bars S on the tip end-side of the wire W engaged by the center hook 70C and the second side hook 70R and on the terminal end-side of the wire W engaged by the center hook 70C and the first side hook 70L.

Thereby, the wire W engaged between the second side hook 70R and the center hook 70C is kept sandwiched by the bending portion 71*c*1. Also, the wire W engaged between the first side hook 70L and the center hook 70C is kept sandwiched by the bending portion 71*c*2.

Figure 11A:
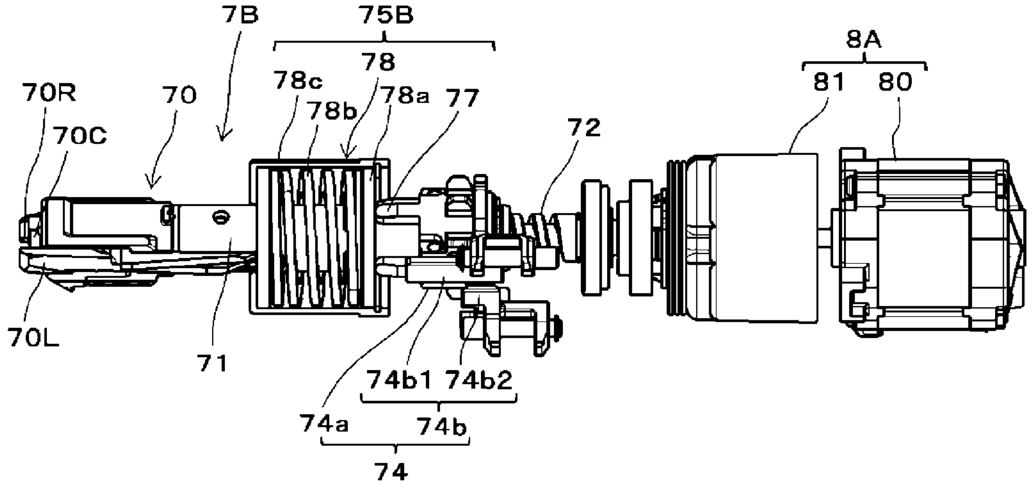
FIG. 11A is a perspective view depicting an example of operations of the binding unit and the drive unit of the second embodiment.
Figure 11B:
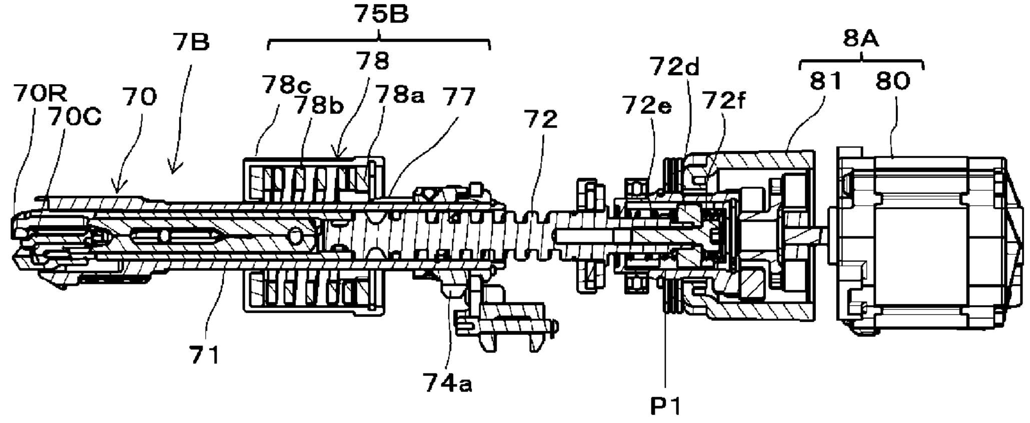
FIG. 11B is a sectional perspective view depicting the example of operations of the binding unit and the drive unit of the second embodiment.
Figure 11C:
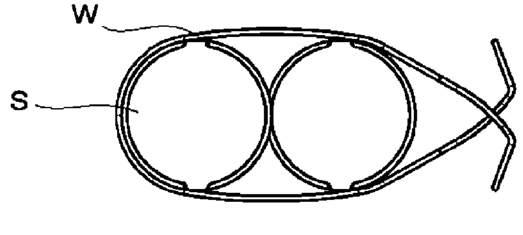
FIG. 11C illustrates an example of a wire form during the binding process.

FIG. 11A is a perspective view depicting an example of operations of the binding unit and the drive unit of the second embodiment. FIG. 11B is a sectional perspective view depicting the example of operations of the binding unit and the drive unit of the second embodiment, and FIG. 11C illustrates an example of a wire form during the binding process.

In the binding unit 7B, in the operation area where the sleeve 71 moves forward without rotating, when the rotary shaft 72 further rotates in the state where the projection 77 is butted against the convex portion 78*e* of the regulation plate 78*a* of the position regulation part 78, the forward movement of the sleeve 71 is regulated by the position regulation spring 78*b* of the position regulation part 78. In a state where the rotation and forward movement of the sleeve 71 are regulated, the rotary shaft 72 rotates in the forward direction, so that the rotary shaft 72 moves backward from the first position P1 while compressing the second spring 72*f*, as shown in FIGS. 11A and 11B. Thereby, the center hook 70C, the first side hook 70L and the second side hook 70R move backward together with the rotary shaft 72.

The center hook 70C, the first side hook 70L, the second side hook 70R, and the rotary shaft 72 move backward in the axis direction of the rotary shaft 72 by predetermined amounts, so that the portion of the wire W engaged by the wire engaging body 70 is pulled backward. Thereby, as shown in FIG. 11C, the wire W is applied with tension in the tangential directions of the reinforcing bars S and is pulled to closely contact the reinforcing bars S. The loads of the position regulation spring 78*b* and the second spring 72*f*, and the like are set so that the tension applied to the wire W is equal to or larger than 10% and equal to or smaller than 50% with respect to the maximum tensile load of the wire W. When the tension applied to the wire W is equal to or larger than 10% and equal to or smaller than 50% with respect to the maximum tensile load of the wire W, the loosening due to an extra part of the wire can be removed, the wire W can be closely contacted to the reinforcing bars S, and the wire W can be prevented from being carelessly cut. In addition, it is possible to suppress the unnecessarily high outputs of the motor 80 and the feeding motor (not shown). Therefore, it is possible to suppress increases in the size of the motor and the size of the entire device so as to make the device sturdy, which leads to improvement on a handling property as a product.

Figure 12A:
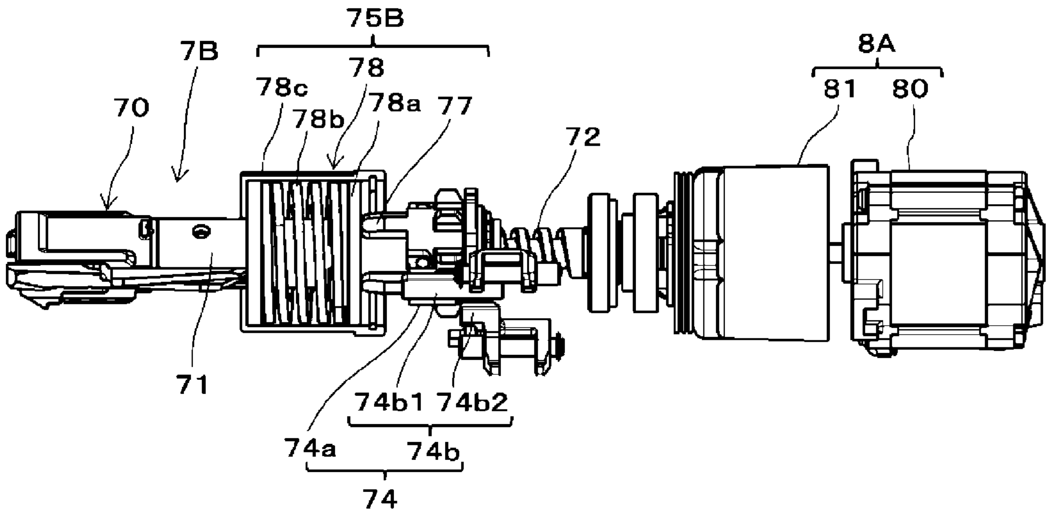
FIG. 12A is a perspective view depicting an example of operations of the binding unit and the drive unit of the second embodiment.
Figure 12B:
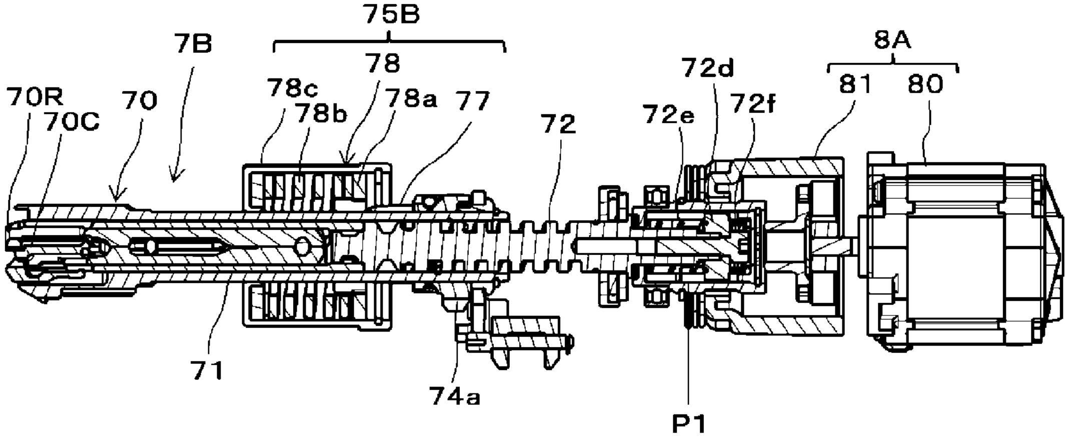
FIG. 12B is a sectional perspective view depicting the example of operations of the binding unit and the drive unit of the second embodiment.
Figure 12C:
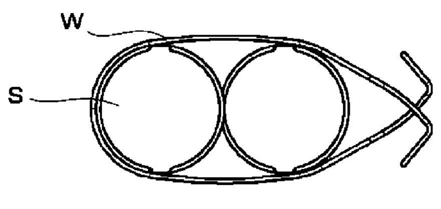
FIG. 12C illustrates an example of a wire form during the binding process.

FIG. 12A is a perspective view depicting an example of operations of the binding unit and the drive unit of the second embodiment, FIG. 12B is a sectional perspective view depicting the example of operations of the binding unit and the drive unit of the second embodiment, and FIG. 12C illustrates an example of a wire form during the binding process.

In the binding unit 7B, in the operation area where the sleeve 71 moves forward without rotating, the center hook 70C, the first side book 70L, the second side hook 70R, and the rotary shaft 72 move backward in the axis direction of the rotary shaft 72 in the state where the projection 77 is butted against the convex portion 78*e* of the regulation plate 78*a* of the position regulation part 78, as described above.

When the center hook 70C, the first side hook 70L, the second side hook 70R and the rotary shaft 72 move further backward in the axis direction of the rotary shaft 72 as the rotary shaft 72 rotates in the forward direction, the portion of the wire W engaged by the wire engaging body 70 is pulled backward, so that a load of pulling the wire W increases.

When the load of pulling the wire W becomes higher than a load with which the position regulation spring 78*b* of the position regulation part 78 presses the projection 77, the sleeve 71 moves forward while compressing the position regulation spring 78*b*, as shown in FIGS. 12A and 128. In the operation area where the sleeve 71 moves forward without rotating, the state where the projection 77 is butted against the convex portion 78*e* of the regulation plate 78*a* of the position regulation part 78 and the center hook 70C, the first side hook 70L, the second side hook 70R and the rotary shaft 72 are moved backward is kept.

Thereby, the portion of the wire W engaged by the wire engaging body 70 is pulled backward, and the wire W is applied with tension in the tangential directions of the reinforcing bars S and is pulled to closely contact the reinforcing bars S, as shown in FIG. 12C.

Figure 13A:
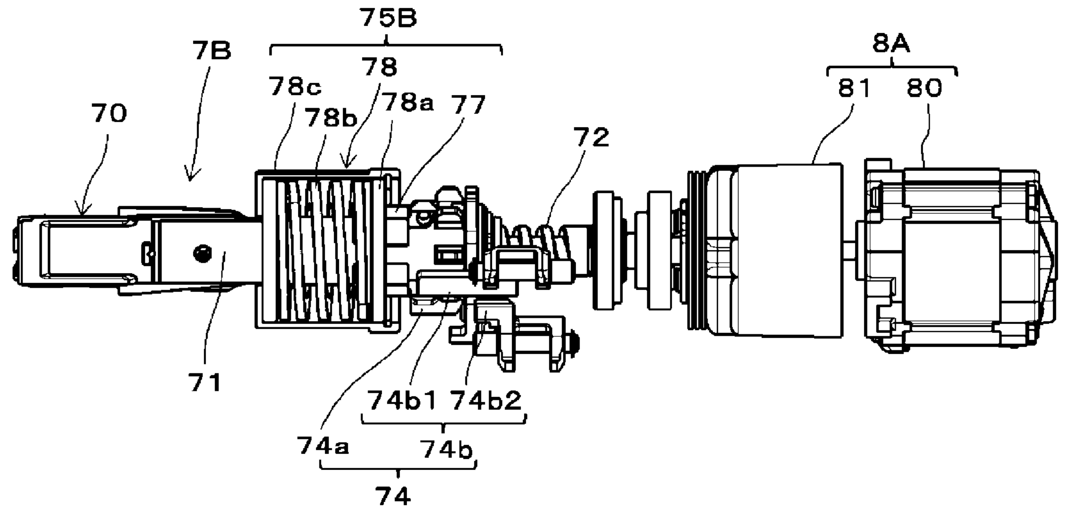
FIG. 13A is a perspective view depicting an example of operations of the binding unit and the drive unit of the second embodiment.
Figure 13B:
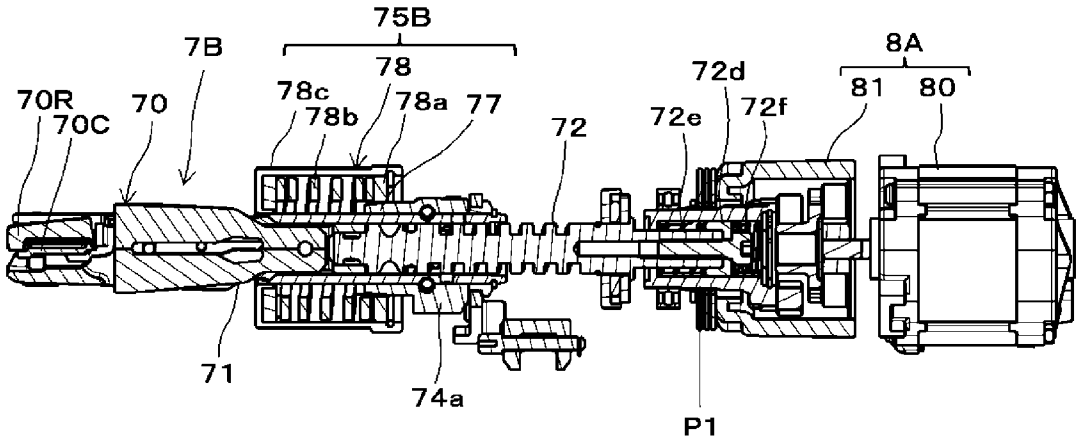
FIG. 13B is a sectional perspective view depicting the example of operations of the binding unit and the drive unit of the second embodiment.
Figure 13C:
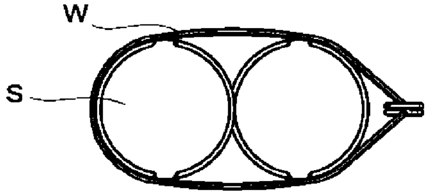
FIG. 13C illustrates an example of a wire form during the binding process.

FIG. 13A is a perspective view depicting an example of operations of the binding unit and the drive unit of the second embodiment. FIG. 13B is a sectional perspective view depicting the example of operations of the binding unit and the drive unit of the second embodiment, and FIG. 13C illustrates an example of a wire form during the binding process.

In a state where the rotary shaft 72 is moved backward, when the motor 80 is further driven in the forward rotation direction and the sleeve 71 is thus moved forward up to a predetermined position, the sleeve reaches an operation area in which the wire W engaged by the wire engaging body 70 is twisted. In the operation area in which the wire W engaged by the wire engaging body 70 is twisted, the engaged state of the rotation regulation blade 74*a* with the rotation regulation claw 74*b* is released.

Thereby, the motor 80 is further driven in the forward rotation direction, so that the wire engaging body 70 is rotated to twist the wire W in conjunction with the rotary shaft 72.

In the binding unit 7B, in the operation area where the sleeve 71 rotates, the sleeve 71 rotates, so that the position of the projection 77 in the rotation direction of the sleeve 71 deviates from the convex portion 78*e* (FIG. 9A and the like) of the regulation plate 78*a* of the position regulation part 78.

In the binding unit 7B, in the operation area where the sleeve 71 rotates, when the position of the projection 77 in the rotation direction of the sleeve 71 faces the concave portion 78*f* (FIG. 9A and the like) of the regulation plate 78*a* of the position regulation part 78, the projection 77 can enter the concave portion 78*f* of the regulation plate 78*a* and the regulation plate 78*a* moves backward, so that the load of the position regulation spring 78*b* pushing the projection 77 is released, as shown in FIGS. 13A and 13B. Thereby, the tension applied to the wire W is released.

In the binding unit 7B, in the operation area where the sleeve 71 rotates, the reinforcing bars S are butted against the butting part 91 and the backward movement of the reinforcing bar, S toward the binding unit 7B is regulated. Therefore, as shown in FIG. 13C, the wire W is twisted, so that a force capable of pulling the wire engaging body 70 forward in the axis direction of the rotary shaft 72 is applied.

Thereby, in the binding unit 7B, in the operation area where the sleeve 71 rotates, the wire engaging body 70 and the rotary shaft 72 move forward while receiving the force pushed backward by the spring 72*e*.

Figure 14A:
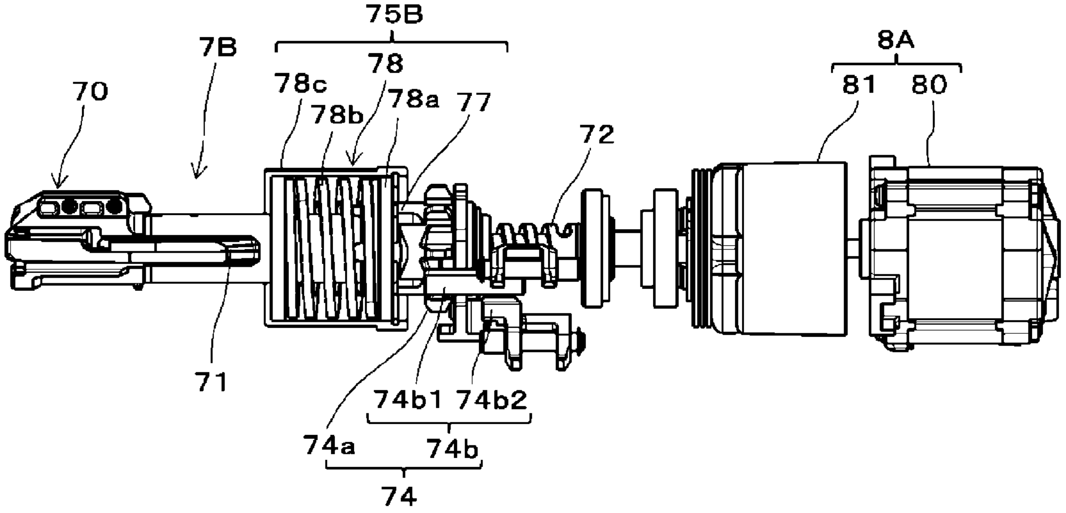
FIG. 14A is a perspective view depicting an example of operations of the binding unit and the drive unit of the second embodiment.
Figure 14B:
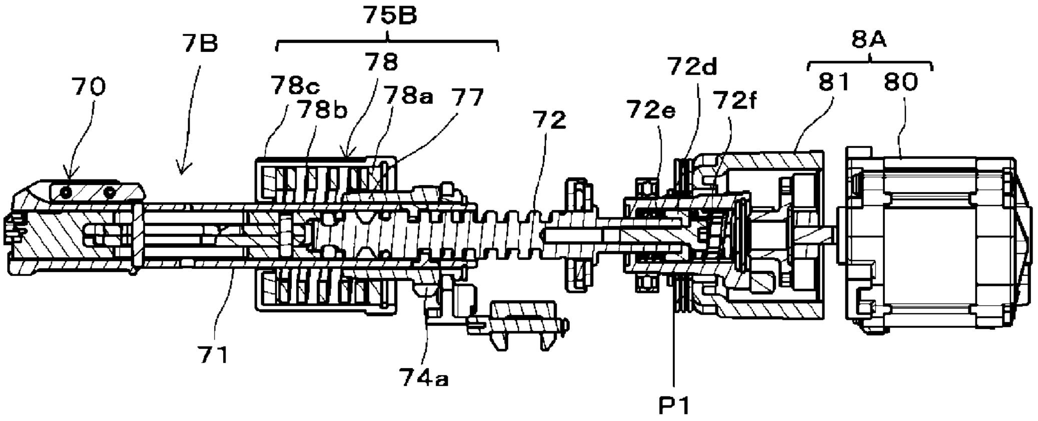
FIG. 14B is a sectional perspective view depicting the example of operations of the binding unit and the drive unit of the second embodiment.
Figure 14C:
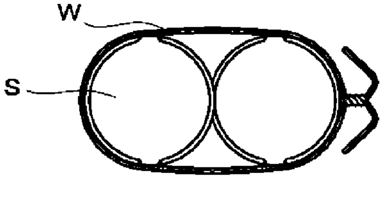
FIG. 14C illustrates an example of a wire form during the binding process.

FIG. 14A is a perspective view depicting an example of operations of the binding unit and the drive unit of the second embodiment, FIG. 14B is a sectional perspective view depicting the example of operations of the binding unit and the drive unit of the second embodiment, and FIG. 14C illustrates an example of a wire form during the binding process.

In the binding unit 7B, in the operation area where the sleeve 71 rotates, when the wire engaging body 70 further rotates in conjunction with the rotary shaft 72, the wire engaging body 70 and the rotary shaft 72 move in the forward direction in which the gap between the twisted portion of the wire W and the reinforcing bar S becomes smaller, thereby further twisting the wire W, as shown in FIGS. 14A and 14B.

Therefore, the wire W is twisted as the wire engaging body 70 and the rotary shaft 72 are moved forward with receiving the force pushed backward by the spring 72*e*, so that the gap between the twisted portion of the wire W and the reinforcing bars S is reduced and the wire is closely contacted to the reinforcing bar S in a manner of following the reinforcing bar S, as shown in FIG. 14C.

<Configuration Example of Binding Unit of Third Embodiment>

Figure 15:
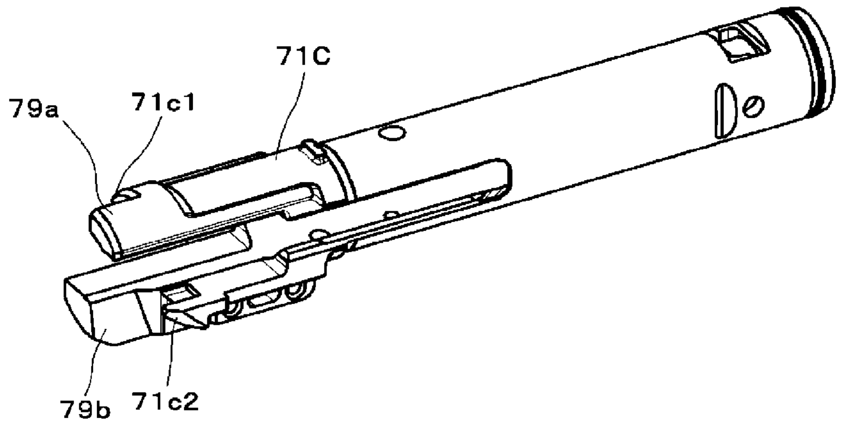
FIG. 15 is a perspective view depicting an example of a sleeve configuring a binding unit of a third embodiment.

FIG. 15 is a perspective view depicting an example of a sleeve configuring a binding unit of a third embodiment. Note that, as for the binding unit of the third embodiment, the same configurations as the binding unit of the first embodiment are denoted with the same reference signs, and the detailed descriptions thereof are omitted.

A sleeve 71C includes a first tension applying part 79*a* and a second tension applying part 79*b*. The first tension applying part 79*a* is configured by a convex portion provided at a front end portion of the sleeve 71C and protruding forward from the bending portion 71*c*1. The second tension applying part 79*b* is configured by a convex portion provided at the front end portion of the sleeve 71C and protruding forward from the bending portion 71*c*2.

<Example of Operations of Binding Unit of Third Embodiment>

FIGS. 16A to 16D are side views depicting an example of operations of the binding unit of the third embodiment. Subsequently, operations of binding the reinforcing bars S with the wire W by the binding unit 7C of the third embodiment are described with reference to the respective drawings. Note that, the operation of feeding the wire W in the forward direction and winding the wire around the reinforcing bars S by the curl forming unit 5A, the operation of engaging the wire W by the wire engaging body 70, the operation of feeding the wire W in the reverse direction and winding the wire on the reinforcing bars S and the operation of cutting the wire W are the same as the operations of the reinforcing bar binding machine 1A.

Figure 16A:
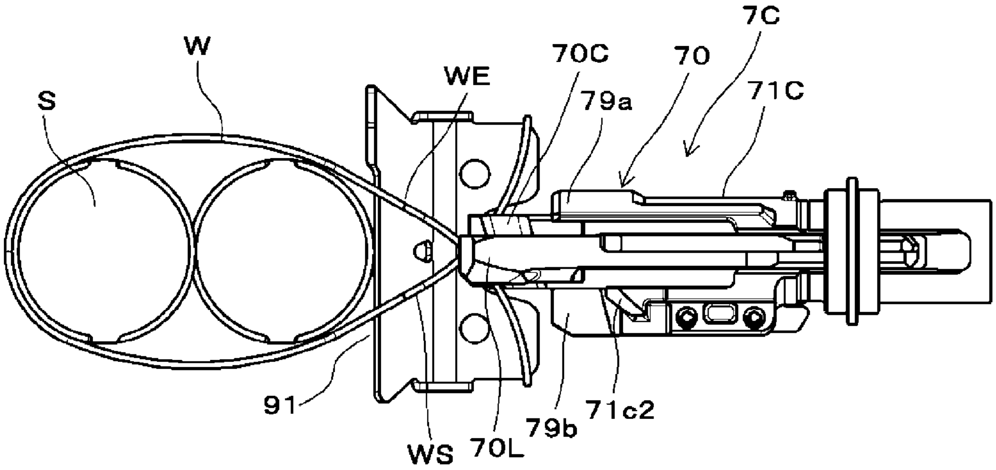
FIG. 16A is a side view depicting an example of an operation of a binding unit of the third embodiment.

In the binding unit 7C, in an operation area where the sleeve 71C moves forward without rotating, as shown in FIG. 16A, a portion WE of the wire W wound on the reinforcing bars S, which is located between the reinforcing bars S and a position engaged between the center hook 70C and the first side hook 70L, faces the first tension applying part 79*a*. Also, a portion WS of the wire W wound on the reinforcing bars S, which is located between the reinforcing bars S and a position engaged between the center hook 70C and the second side hook 70R, faces the second tension applying part 79*b*.

Figure 16B:
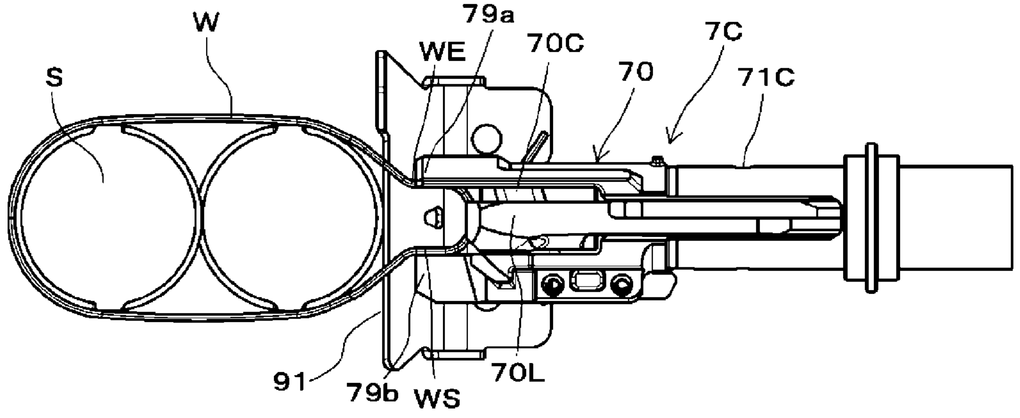
FIG. 16B is a side view depicting the example of the operation of the binding unit of the third embodiment.

In the binding unit 7C, when the sleeve 71C moves forward without rotating, the portion WE of the wire W wound on the reinforcing bars S, which is located between the reinforcing bars S and the position engaged between the center hook 70C and the first side hook 70L, is pushed and deformed by the first tension applying part 79*a* and is thus pushed between the first tension applying part 79*a* and the second tension applying part 79*b* of the sleeve 71C, as shown in FIG. 16B. Also, the portion WS of the wire W wound on the reinforcing bars S, which is located between the reinforcing bars S and the position engaged between the center hook 70C and the second side hook 70R, is pushed and deformed by the second tension applying part 79*b* and is thus pushed between the first tension applying part 79*a* and the second tension applying part 79*b* of the sleeve 71C.

Thereby, the wire W is applied with tension in the tangential directions of the reinforcing bars S and is pulled to closely contact the reinforcing bars S. A length of the first tension applying part 79*a*, a length of the second tension applying part 79*b* and the like are set so that the tension applied to the wire W is equal to or larger than 10% and equal to or smaller than 50% with respect to the maximum tensile load of the wire W. When the tension applied to the wire W is equal to or larger than 10% and equal to or smaller than 50% with respect to the maximum tensile load of the wire WV, the loosening due to an extra part of the wire can be removed, the wire W can be closely contacted to the reinforcing bars S, and the wire W can be prevented from being carelessly cut. In addition, it is possible to suppress the unnecessarily high outputs of the motor 80 and the feeding motor (not shown). Therefore, it is possible to suppress increases in a size of the motor and a size of the entire device so as to make the device sturdy, which leads to improvement on a handling property as a product.

Figure 16C:
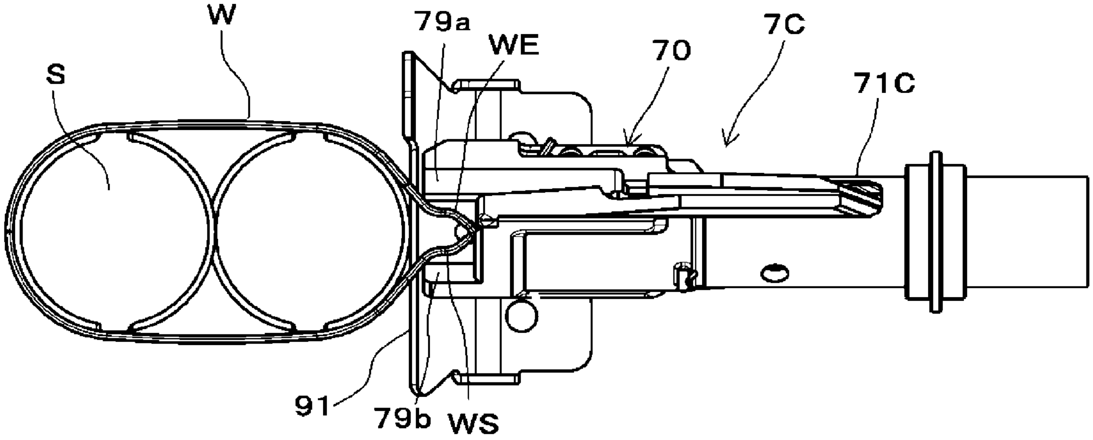
FIG. 16C is a side view depicting the example of the operation of the binding unit of the third embodiment.

In the binding unit 7C, in the operation area where the sleeve 71C rotates, the first tension applying part 79*a* comes off from the portion WE of the wire W wound on the reinforcing bars S, which is located between the reinforcing bars S and the position engaged between the center hook 70C and the first side hook 70L, as shown in FIG. 16C. Also, the second tension applying part 79*b* comes off from the portion WS of the wire W wound on the reinforcing bars S, which is located between the reinforcing bars S and the position engaged between the center hook 70C and the second side hook 70R. Thereby, the tension applied to the wire W in the tangential directions of the reinforcing bars S is released.

The binding unit 7C twists the wire W when the wire engaging body 70 rotates. At this time, the portion WE of the wire W wound on the reinforcing bars S, which is located between the reinforcing bars S and the position engaged between the center hook 70C and the first side hook 70L, and the portion WS of the wire W wound on the reinforcing bars S, which is located between the reinforcing bars S and the position engaged between the center hook 70C and the second side hook 70R, are deformed to come close to each other. Therefore, even when the sleeve 71C rotates, the wire W is not contacted to the first tension applying part 79*a* and the second tension applying part 79*b*.

Figure 16D:
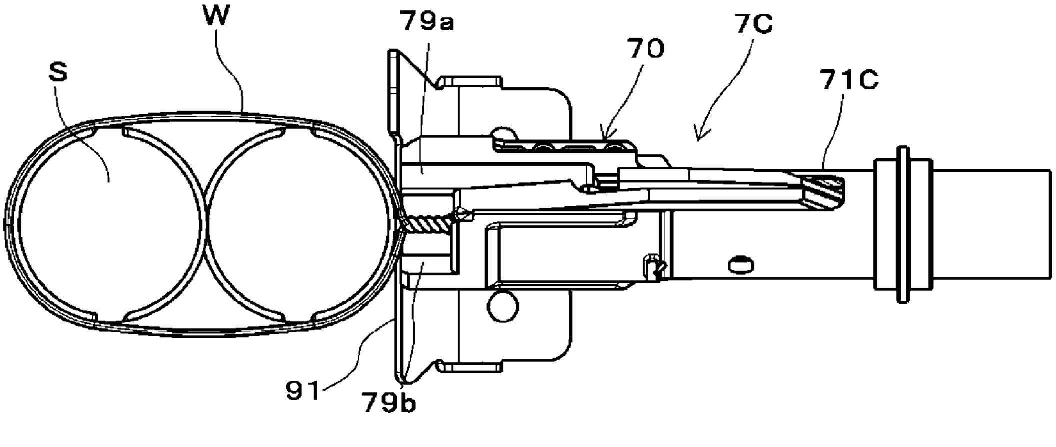
FIG. 16D is a side view depicting the example of the operation of the binding unit of the third embodiment.

When the wire engaging body 70 further rotates, the binding unit 7C further twists the wire W while the wire engaging body 70 moves forward in the direction in which a gap between the twisted portion of the wire W and the reinforcing bar S becomes smaller, as shown in FIG. 16D.

Therefore, the gap between the twisted portion of the wire W and the reinforcing bar S is reduced, and the wire W is closely contacted to the reinforcing bar S in a manner of following the reinforcing bar S.

<Configuration Example of Binding Unit and Drive Unit of Fourth Embodiment>

Figure 17A:
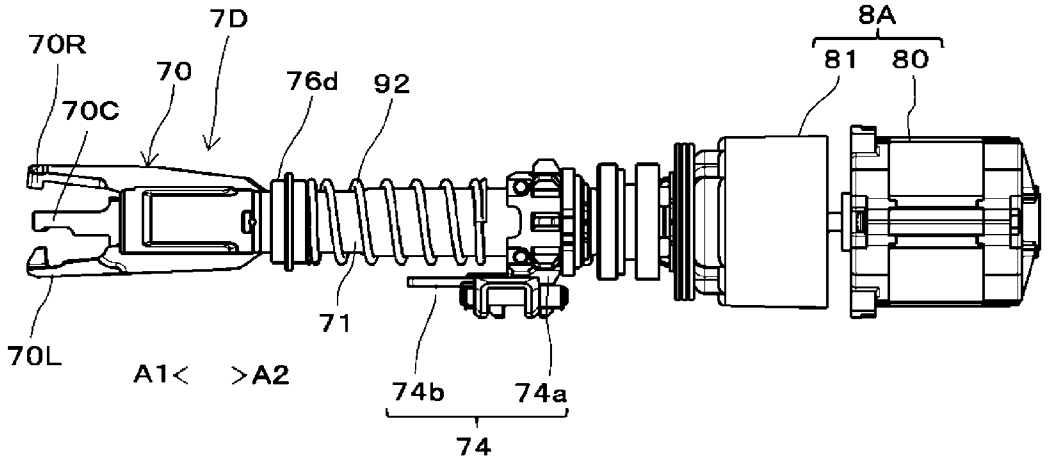
FIG. 17A is a perspective view depicting an example of operations of a binding unit and a drive unit of a fourth embodiment.
Figure 17B:
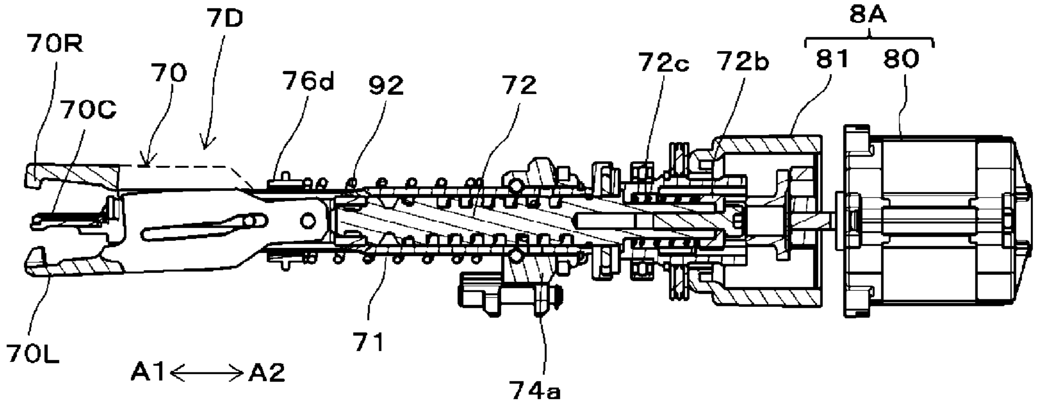
FIG. 17B is a sectional perspective view depicting the example of operations of the binding unit and the drive unit of the fourth embodiment.

FIG. 17A is a perspective view depicting an example of a binding unit and a drive unit of a fourth embodiment, and FIG. 17B is a sectional perspective view depicting the example of the binding unit and the drive unit of the fourth embodiment. Note that, as for the binding unit and the drive unit of the fourth embodiment, the same configurations as the binding unit and the drive unit of the first embodiment are denoted with the same reference signs, and the detailed descriptions thereof are omitted.

A binding unit 7D includes a tension applying spring 92 for moving the wire engaging body 70 and applying tension to the wire W. The tension applying spring 92 is an example of the tension applying part, and is fitted to the outer periphery of the sleeve 71 between the rotation regulation blade 74*a* and the support frame 76*d* configured to support the sleeve 71 so as to be rotatable and slidable in the axis direction.

The tension applying spring 92 urges backward the rotary shaft 72 according to a position of the sleeve 71 in the axis direction of the rotary shaft 72. The rotary shaft 72 is connected to the decelerator 81 via the connection portion 72*b* having a configuration that can cause the rotary shaft 72 to move in the axis direction.

Thereby, when a force for moving forward in the axis direction is applied to the wire engaging body 70, the wire engaging body 70 and the rotary shaft 72 can be moved forward while receiving the force pushed backward by the tension applying spring 92 and the spring 72*c*.

<Example of Operations of Binding Unit and Drive Unit of Fourth Embodiment>

Figure 18A:
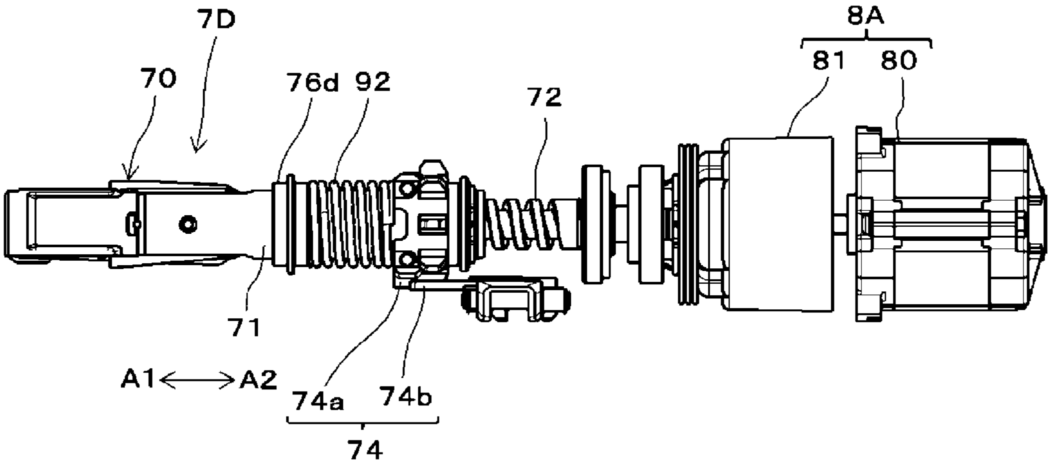
FIG. 18A is a perspective view depicting an example of operations of the binding unit and the drive unit of the fourth embodiment.
Figure 18B:
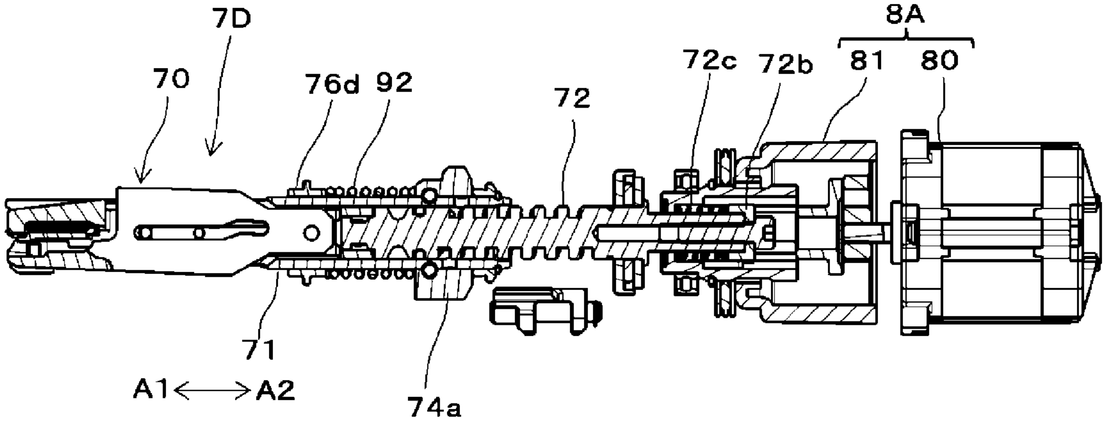
FIG. 18B is a sectional perspective view depicting the example of operations of the binding unit and the drive unit of the fourth embodiment.

FIG. 18A is a perspective view depicting an example of operations of the binding unit and the drive unit of the fourth embodiment, and FIG. 14B is a sectional perspective view depicting the example of operations of the binding unit and the drive unit of the fourth embodiment. Subsequently, operations of binding the reinforcing bars S with the wire W by the binding unit 7D and the drive unit. 8A of the fourth embodiment are described with reference to the respective drawings. Note that, the operation of feeding the wire W in the forward direction and winding the wire around the reinforcing bars S by the curl forming unit 5A, the operation of engaging the wire W by the wire engaging body 70, the operation of feeding the wire W in the reverse direction and winding the wire on the reinforcing bars S and the operation of cutting the wire W are the same as the operations of the reinforcing bar binding machine 1A.

In the operation area where the sleeve 71 moves forward from the standby position without rotating, when the sleeve 71 moves forward up to a predetermined position, the engaging of the rotation regulation blade 74*a* with the rotation regulation claw 74*b* is released, so that the binding unit 7D reaches the operation area where the sleeve 71 rotates.

In the binding unit 7D, the wire W engaged by the wire engaging body 70 is twisted in the operation area where the sleeve 71 rotates, so that the force capable of pulling the wire engaging body 70 forward in the axis direction of the rotary shaft 72 is applied.

Thereby, when a force for moving forward in the axis direction is applied to the wire engaging body 70, the wire engaging body 70 and the rotary shaft 72 are moved forward while receiving the force pushed backward by the tension applying spring 92 and the spring 72*c*, thereby twisting the wire W while moving forward.

Therefore, the portion of the wire W engaged by the wire engaging body 70 is pulled backward, and the tension is applied in the tangential directions of the reinforcing bars S, so that the wire W is pulled to closely contact the reinforcing bars S. The loads of the tension applying spring 92 and the spring 72*c*, and the like are set so that the tension applied to the wire W is equal to or larger than 10% and equal to or smaller than 50% with respect to the maximum tensile load of the wire W. When the tension applied to the wire W is equal to or larger than 10% and equal to or smaller than 50% with respect to the maximum tensile load of the wire W, the loosening due to an extra part of the wire can be removed, the wire W can be closely contacted to the reinforcing bars S. and the wire W can be prevented from being carelessly cut. In addition, it is possible to suppress the unnecessarily high outputs of the motor 80 and the feeding motor (not shown). Therefore, it is possible to suppress increases in the size of the motor and the size of the entire device so as to make the device sturdy, which leads to improvement on a handling property as a product.

In the binding unit 7D, in the operation area where the sleeve 71 rotates, when the wire engaging body 70 further rotates in conjunction with the rotary shaft 72, the wire engaging body 70 and the rotary shaft 72 move in the forward direction in which the gap between the twisted portion of the wire W and the reinforcing bar S becomes smaller, thereby further twisting the wire W.

Therefore, when the tension applied to the wire W is equal to or larger than 10% and equal to or smaller than 50% A with respect to the maximum tensile load of the wire W, the wire W is twisted as the wire engaging body 70 and the rotary shaft 72 are moved forward with receiving the force pushed backward by the tension applying spring 92 and the spring 72*c*, so that the gap between the twisted portion of the wire W and the reinforcing bars S is reduced and the wire is closely contacted to the reinforcing bar S in a manner of following the reinforcing bar S.

<Configuration Example of Binding Unit and Drive Unit of Fifth Embodiment>

Figure 19A:
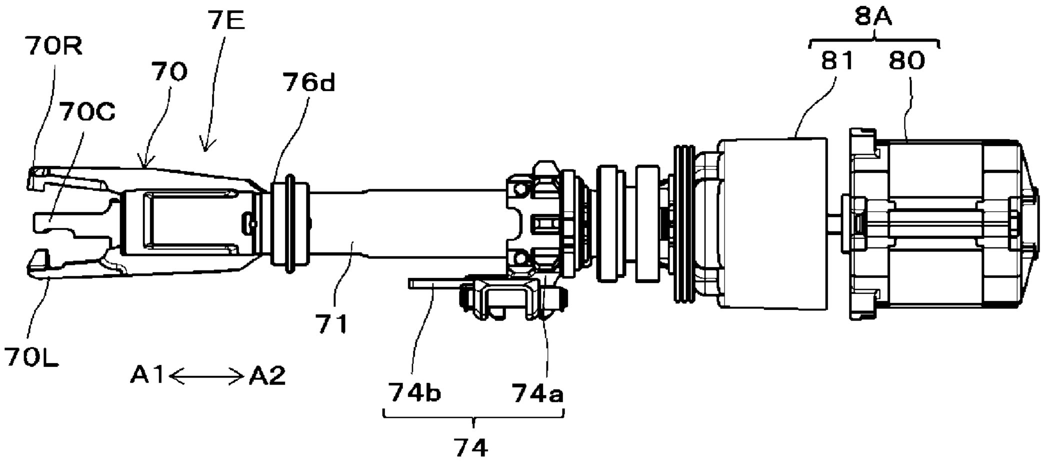
FIG. 19A is a perspective view depicting an example of operations of a binding unit and a drive unit of a fifth embodiment.
Figure 19B:
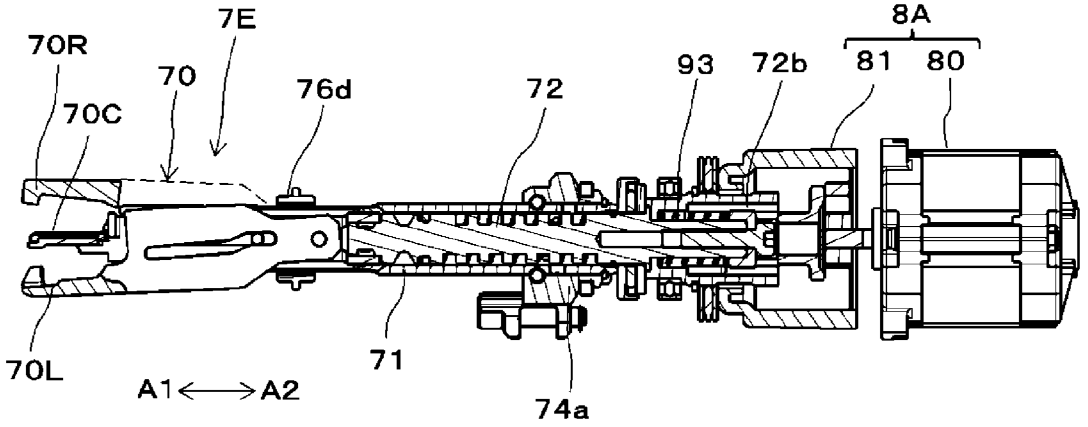
FIG. 19B is a sectional perspective view depicting the example of operations of the binding unit and the drive unit of the fifth embodiment.

FIG. 19A is a perspective view depicting an example of a binding unit and a drive unit of a fifth embodiment, and FIG. 19B is a sectional perspective view depicting the example of the binding unit and the drive unit of the fourth embodiment. Note that, as for the binding unit and the drive unit of the fifth embodiment, the same configurations as the binding unit and the drive unit of the first embodiment are denoted with the same reference signs, and the detailed descriptions thereof are omitted.

A binding unit 7E includes a tension applying spring 93 for moving the wire engaging body 70 and applying tension to the wire W. The tension applying spring 93 is an example of the tension applying part, and is provided to the connection portion 72*b* having a configuration that can cause the rotary shaft 72 to move in the axis direction, and configured to connect the rotary shaft 72 and the decelerator 81. The tension applying spring 93 urges backward the rotary shalt 72 according to a position of the wire engaging body 70 in the axis direction of the rotary shaft 72.

Thereby, when a force for moving forward in the axis direction is applied to the wire engaging body 70, the wire engaging body 70 and the rotary shaft 72 can be moved forward while receiving the force pushed backward by the tension applying spring 93.

<Example of Operations of Binding Unit and Drive Unit of Fifth Embodiment>

Figure 20A:
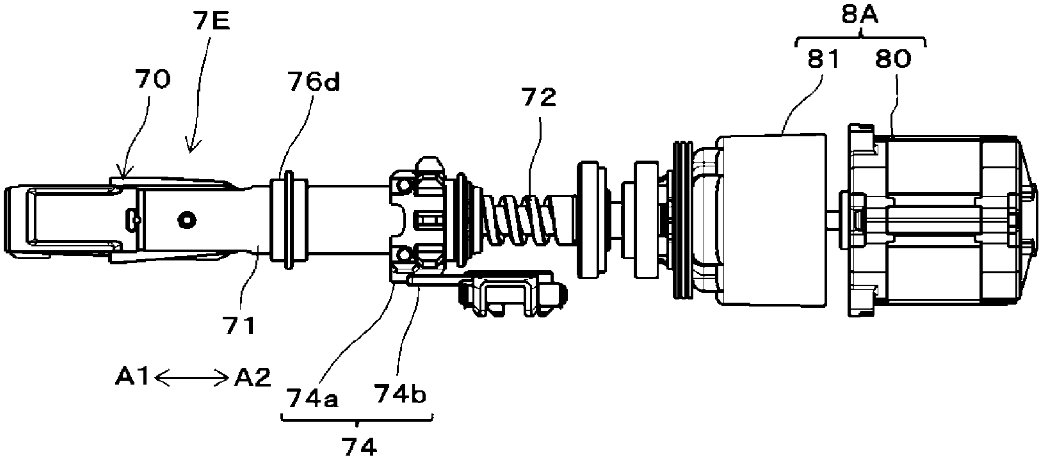
FIG. 20A is a perspective view depicting an example of operations of the binding unit and the drive unit of the fifth embodiment.
Figure 20B:
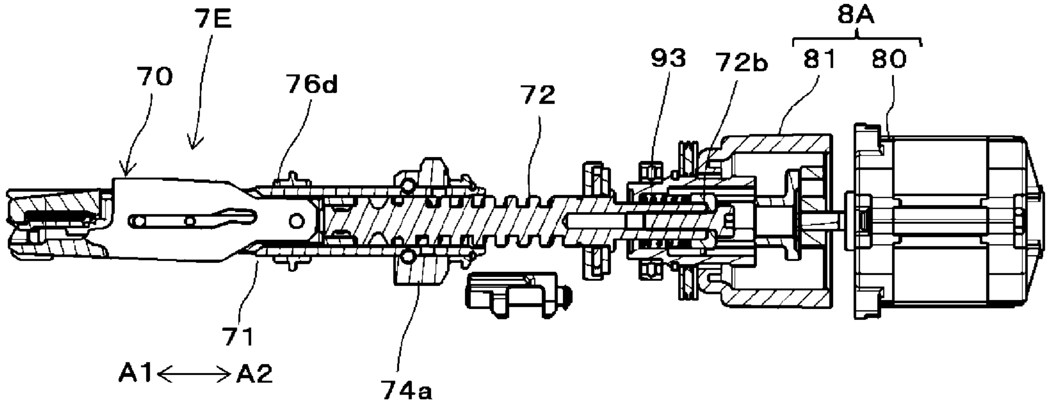
FIG. 20B is a sectional perspective view depicting the example of operations of the binding unit and the drive unit of the fifth embodiment.

FIG. 20A is a perspective view depicting an example of operations of the binding unit and the drive unit of the fifth embodiment, and FIG. 20B is a sectional perspective view depicting the example of operations of the binding unit and the drive unit of the fifth embodiment. Subsequently, operations of binding the reinforcing bars S with the wire W by the binding unit 7E and the drive unit 8A of the fifth embodiment are described with reference to the respective drawings. Note that, the operation of feeding the wire W in the forward direction and winding the wire around the reinforcing bars S by the curl forming unit 5A, the operation of engaging the wire W by the wire engaging body 70, the operation of feeding the wire W in the reverse direction and winding the wire on the reinforcing bars S and the operation of cutting the wire W are the same as the operations of the reinforcing bar binding machine 1A.

In the operation area where the sleeve 71 moves forward from the standby position without rotating, when the sleeve 71 moves forward up to a predetermined position, the engaging of the rotation regulation blade 74*a* with the rotation regulation claw 74*b* is released, so that the binding unit 7E reaches the operation area where the sleeve 71 rotates.

In the binding unit 7E, the wire W engaged by the wire engaging body 70 is twisted in the operation area where the sleeve 71 rotates, so that the force capable of pulling the wire engaging body 70 forward in the axis direction of the rotary shaft 72 is applied.

Thereby, when a force for moving forward in the axis direction is applied to the wire engaging body 70, the wire engaging body 70 and the rotary shaft 72 are moved forward while receiving the force pushed backward by the tension applying spring 93, thereby twisting the wire W while moving forward.

Therefore, the portion of the wire W engaged by the wire engaging body 70 is pulled backward, and the tension is applied in the tangential directions of the reinforcing bars S, so that the wire W is pulled to closely contact the reinforcing bars S. The load of the tension applying spring 93 and the like are set so that the tension applied to the wire W is equal to or larger than 10% and equal to or smaller than 50% with respect to the maximum tensile load of the wire W. When the tension applied to the wire W is equal to or larger than 10% and equal to or smaller than 50% with respect to the maximum tensile load of the wire W, the loosening due to an extra part of the wire can be removed, the wire W can be closely contacted to the reinforcing bars S. and the wire W can be prevented from being carelessly cut. In addition, it is possible to suppress the unnecessarily high outputs of the motor 80 and the feeding motor (not shown). Therefore, it is possible to suppress increases in the size of the motor and the size of the entire device so as to make the device sturdy, which leads to improvement on a handling property as a product.

In the binding unit 7E, in the operation area where the sleeve 71 rotates, when the wire engaging body 70 further rotates in conjunction with the rotary shaft 72, the wire engaging body 70 and the rotary shaft 72 move in the forward direction in which the gap between the twisted portion of the wire W and the reinforcing bar S becomes smaller, thereby further twisting the wire W.

Therefore, when the tension applied to the wire W is equal to or larger than 10% and equal to or smaller than 50% A with respect to the maximum tensile load of the wire W, the wire W is twisted as the wire engaging body 70 and the rotary shaft 72 are moved forward with receiving the force pushed backward by the tension applying spring 93, so that the gap between the twisted portion of the wire W and the reinforcing bars S is reduced and the wire is closely contacted to the reinforcing bar S in a manner of following the reinforcing bar S.

What is claimed is:

1. A binding machine comprising:

a wire feeding unit configured to feed a wire;

a curl forming unit configured to form a path along which the wire fed by the wire feeding unit is to be wound around a to-be-bound object;

a butting part against which the to-be-bound object is to be butted;

a cutting unit configured to cut the wire wound on the to-be-bound object; and a binding unit configured to twist the wire wound on the to-be-bound object, wherein the binding unit comprises:
a rotary shaft;
a wire engaging body configured to move in an axis direction of the rotary shaft and to engage the wire in a first operation area in the axis direction of the rotary shaft, and configured to move in the axis direction of the rotary shaft and to twist the wire when rotating together with the rotary shaft in a second operation area in the axis direction of the rotary shaft;
a rotation regulation part configured to regulate rotation of the wire engaging body; and
a tension applying part including a tension applying spring provided on an outer periphery of the wire engaging body, the tension applying spring being configured to urge the wire engaging body away from the butting part, wherein the tension apply part is configured to thereby perform, in the second operation area, an operation of applying tension on the wire engaged by the wire engaging body in the first operation area, and
wherein the tension applied to the wire is equal to or larger than 10% and equal to or smaller than 50% with respect to a maximum tensile load of the wire.

2. The binding machine according to claim 1, wherein the tension applying part is configured to move the wire engaging body in a direction away from the butting part upon release of regulation of the rotation of the wire engaging body by the rotation regulation part, and the tension applying part is further configured to release movement of the wire engaging body in the direction away from the butting part and to cause the wire engaging body to be able to move toward the butting part.

3. The binding machine according to claim 1, wherein the tension applying part is configured to move the wire engaging body in a direction away from the butting art upon regulation of the rotation of the wire engaging body by the rotation regulation part, and the tension applying part is t configured to release movement of the wire engaging body in the direction away from the butting part and to cause the wire engaging body to be able to move toward the butting part.

4. The binding machine according to claim 1, wherein the wire engaging body comprises a hook configured to engage the wire by an opening/closing operation and a sleeve configured to open/close the hook, and
wherein the tension applying part is configured by a convex portion provided at an end portion of the sleeve and protruding in an axis direction of the rotary shaft.

* * * * *